(12) United States Patent
Watanabe et al.

(10) Patent No.: US 7,668,826 B2
(45) Date of Patent: Feb. 23, 2010

(54) PREDICTING APPARATUS, PREDICTING METHOD, AND COMPUTER PRODUCT

(75) Inventors: Masaru Watanabe, Kawasaki (JP); Hideki Hanaoka, Tokyo (JP)

(73) Assignee: Fujitsu Limited, Kawasaki (JP)

(*) Notice: Subject to any disclaimer, the term of this patent is extended or adjusted under 35 U.S.C. 154(b) by 108 days.

(21) Appl. No.: 11/447,145

(22) Filed: Jun. 6, 2006

(65) Prior Publication Data
US 2007/0038587 A1 Feb. 15, 2007

(30) Foreign Application Priority Data
Jul. 27, 2005 (JP) ............................. 2005-217451

(51) Int. Cl.
*G06F 17/30* (2006.01)
(52) U.S. Cl. ............................................. 707/6
(58) Field of Classification Search .................. 707/6, 707/102, 3, 104
See application file for complete search history.

(56) References Cited

U.S. PATENT DOCUMENTS 6,535,227 B1 * 3/2003 Fox et al. .................... 715/736

| | | | |
|---|---|---|---|
| 2002/0081590 A1* | 6/2002 | Penn et al. | 435/6 |
| 2002/0156773 A1* | 10/2002 | Hildebrand et al. | 707/3 |
| 2002/0194113 A1* | 12/2002 | Lof et al. | 705/37 |
| 2004/0122708 A1* | 6/2004 | Avinash et al. | 705/2 |
| 2005/0154692 A1* | 7/2005 | Jacobsen et al. | 706/47 |
| 2005/0170528 A1* | 8/2005 | West et al. | 436/518 |
| 2006/0263825 A1* | 11/2006 | Denny et al. | 435/7.1 |
| 2007/0122864 A1* | 5/2007 | Woods et al. | 435/23 |
| 2007/0162473 A1* | 7/2007 | Hadzikadic et al. | 707/100 |

FOREIGN PATENT DOCUMENTS

| JP | 2003-004739 | | 1/2003 |
|---|---|---|---|
| JP | 2003004739 A | * | 1/2003 |

* cited by examiner

*Primary Examiner*—John R. Cottingham
*Assistant Examiner*—Mohammed R Uddin
(74) *Attorney, Agent, or Firm*—Staas & Halsey LLP

(57) ABSTRACT

A structuring unit generates a combination pattern of the attribute values by combining an attribute value of the assessment target data with an attribute value indicating a unspecified value. A reconstructing unit searches data matching the combination pattern from the accumulation data, and generates subset data. An index setting unit sets an index indicating significance of relationship between the generated subset data with assessment data. An assessing unit selects subset data that becomes a basis of assessment, based on the set index, and performs an assessment on a prediction result based on the selected subset data.

10 Claims, 24 Drawing Sheets

FIG.3

| ELEMENT | GENE A | GENE B | GENE C | DISEASE A | DISEASE B | DISEASE C | DISEASE D |
|---|---|---|---|---|---|---|---|
| ID1 | A1 | B1 | C1 | ○ | × | × | × |
| ID2 | A1 | B2 | C1 | × | × | ○ | × |
| ID3 | A2 | B1 | C1 | × | ○ | ○ | × |
| ID4 | A1 | B1 | C2 | × | × | ○ | × |
| ID5 | A2 | B2 | C2 | × | × | × | ○ |
| ... | ~ | ~ | ~ | × | × | × | ○ |

FIG.4

| ELEMENT | GENE A | GENE B | GENE C |
|---|---|---|---|
| ID_N1 | A1 | B2 | C2 |

| NAME | NUMBER OF ASSESSMENTS | GENE A | GENE B | GENE C |
|---|---|---|---|---|
| X3 | 3 | A1 | B2 | C2 |
| X2a | 2 | * | B2 | C2 |
| X2b | 2 | A1 | * | C2 |
| X2c | 2 | A1 | B2 | * |
| X1a | 1 | A1 | * | * |
| X1b | 1 | * | B2 | * |
| X1c | 1 | * | * | C2 |
| X0 | 0 | * | * | * |

* INDICATES "NOT ASSESSED".
THE NUMBER OF ASSESSMENTS OF "0" INDICATES THAT
ALL ITEMS ARE NOT ASSESSED,
AND INDICATES THAT ALL DATA ARE TARGETED.

| NAME | NUMBER OF ASSESSMENTS | GENE A | GENE B | GENE C | DISEASE A | STATISTIC Y |
|---|---|---|---|---|---|---|
| X3 | 3 | A1 | B2 | C2 | × | Y3H |
| X3 | 3 | A1 | B2 | C2 | ○ | Y3P |
| X2a | 2 | * | B2 | C2 | × | Y2aH |
| X2a | 2 | * | B2 | C2 | ○ | Y2aP |
| X2b | 2 | A1 | * | C2 | × | Y2bH |
| X2b | 2 | A1 | * | C2 | ○ | Y2bP |
| X2c | 2 | A1 | B2 | * | × | Y2cH |
| X2c | 2 | A1 | B2 | * | ○ | Y2cP |
| X1a | 1 | A1 | * | * | × | Y1aH |
| X1a | 1 | A1 | * | * | ○ | Y1aP |
| X1b | 1 | * | B2 | * | × | Y1bH |
| X1b | 1 | * | B2 | * | ○ | Y1bP |
| X1c | 1 | * | * | C2 | × | Y1cH |
| X1c | 1 | * | * | C2 | ○ | Y1cP |
| X0 | 0 | * | * | * | × | Y0H |
| X0 | 0 | * | * | * | ○ | Y0P |

FIG.11

| NAME | NUMBER OF ASSESSMENTS | GENE A | GENE B | GENE C | STATISTIC Z | ASSESSMENT RESULT | RISK ASSESSMENT INDEX |
|---|---|---|---|---|---|---|---|
| X3 | 3 | A1 | B2 | C2 | Z3 | × | 0 |
| X2a | 2 | * | B2 | C2 | Z2a | × | 0 |
| X2b | 2 | A1 | * | C2 | Z2b | ○ (SAFETY) | 1 |
| X2c | 2 | A1 | B2 | * | Z2c | × | 0 |
| X1a | 1 | A1 | * | * | Z1a | ○ (SAFETY) | 2 |
| X1b | 1 | * | B2 | * | Z1b | ○ (DANGER) | 1 |
| X1c | 1 | * | * | C2 | Z1c | × | 0 |
| X0 | 0 | * | * | * | Z0 | ○ (SAFETY) | 3 |

FIG.12

|  | X3 | NOT X3 |
|---|---|---|
| WELL-BEING | Y3H (=A) | (Y0H-Y3H) (=B) |
| DISEASE A | Y3P (=C) | Y0P-Y3P (=D) |

ODDS RATIO: $Z3o = A \times D/(B \times C)$
95% CONFIDENCE INTERVAL (UPPER LIMIT):
$Z3r+ = EXP\{\log(Z3o) + 1.96(1/A+1/B+1/C+1/D)^{0.5}\}$
95% CONFIDENCE INTERVAL (UPPER LIMIT):
$Z3r- = EXP\{\log(Z3o) + 1.96(1/A+1/B+1/C+1/D)^{0.5}\}$ STATISTIC $Z3 = \{Z3o, Z3r+, Z3r-\}$

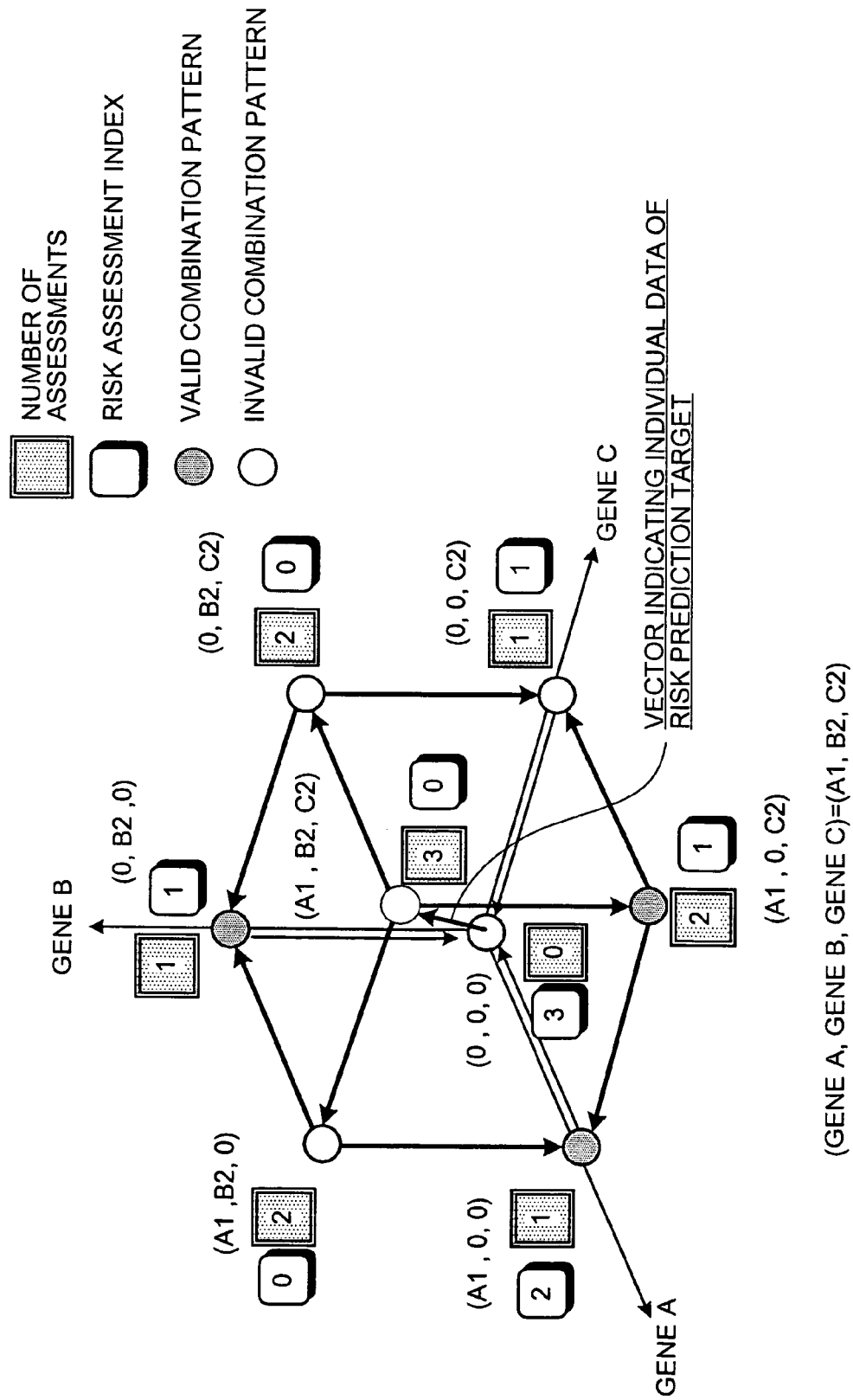

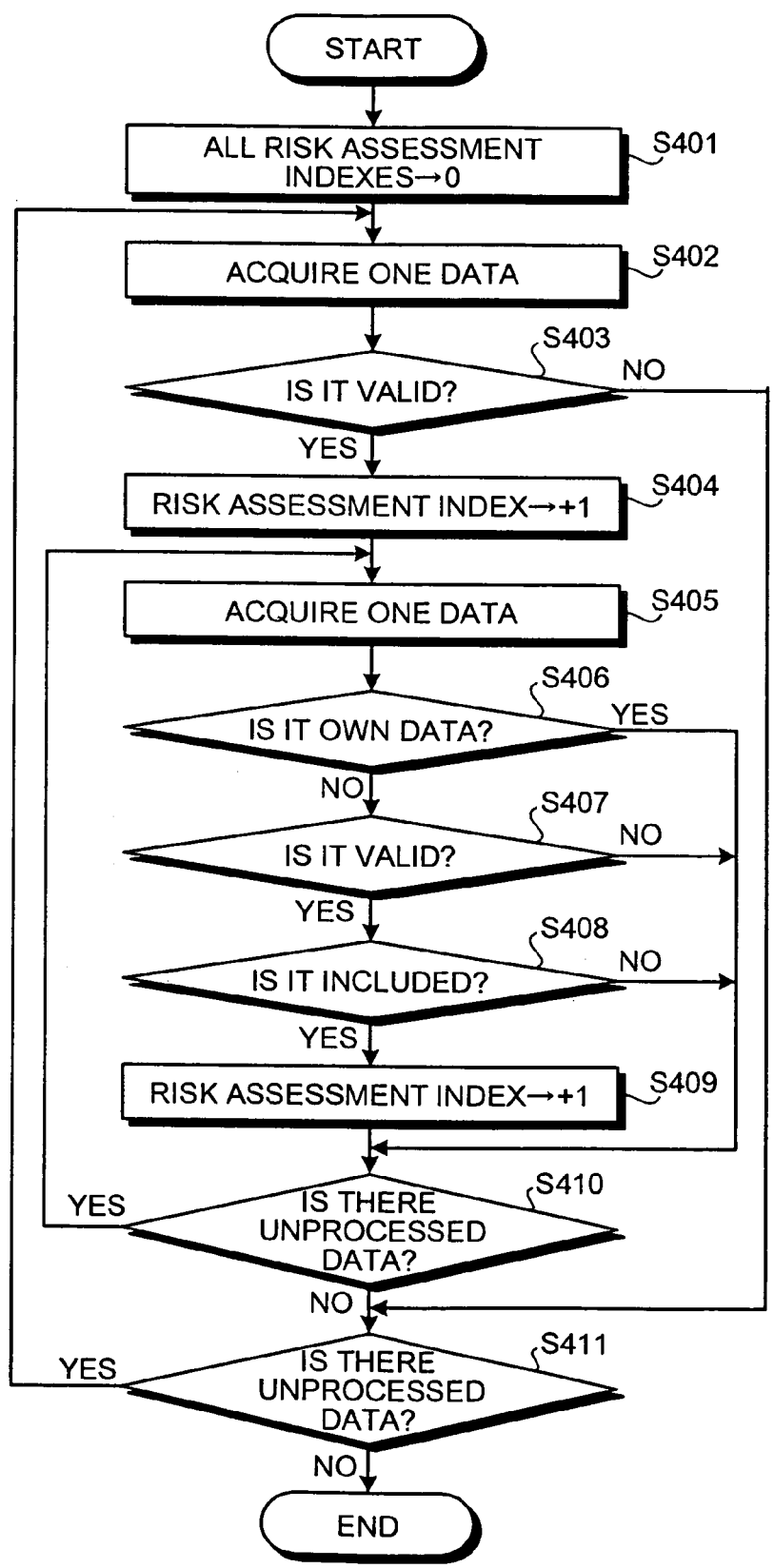

FIG.13D

| NAME | NUMBER OF ASSESSMENTS | GENE A | GENE B | GENE C | STATISTIC Z | ASSESSMENT RESULT | VALID NUMBER | RISK ASSESSMENT INDEX |
|---|---|---|---|---|---|---|---|---|
| X3 | 3 | A1 | B2 | C2 | Z3 | × | 0 | 0 |
| X2a | 2 | * | B2 | C2 | Z2a | × | 0 | 0 |
| X2b | 2 | A1 | * | C2 | Z2b | ○ (SAFETY) | 1 | 1 |
| X2c | 2 | A1 | B2 | * | Z2c | × | 0 | 0 |
| X1a | 1 | A1 | * | * | Z1a | ○ (SAFETY) | 2 | 2 |
| X1b | 1 | * | B2 | * | Z1b | ○ (DANGER) | 1 | 1 |
| X1c | 1 | * | * | C2 | Z1c | × | 1 | 0 |
| X0 | 0 | * | * | * | Z0 | ○ (SAFETY) | 3 | 3 |

ASSESSMENT INDEX = VALID NUMBER × (ASSESSMENT RESULT)

ASSESSMENT RESULT = $\begin{cases} ○ : =1 \\ × : =0 \end{cases}$

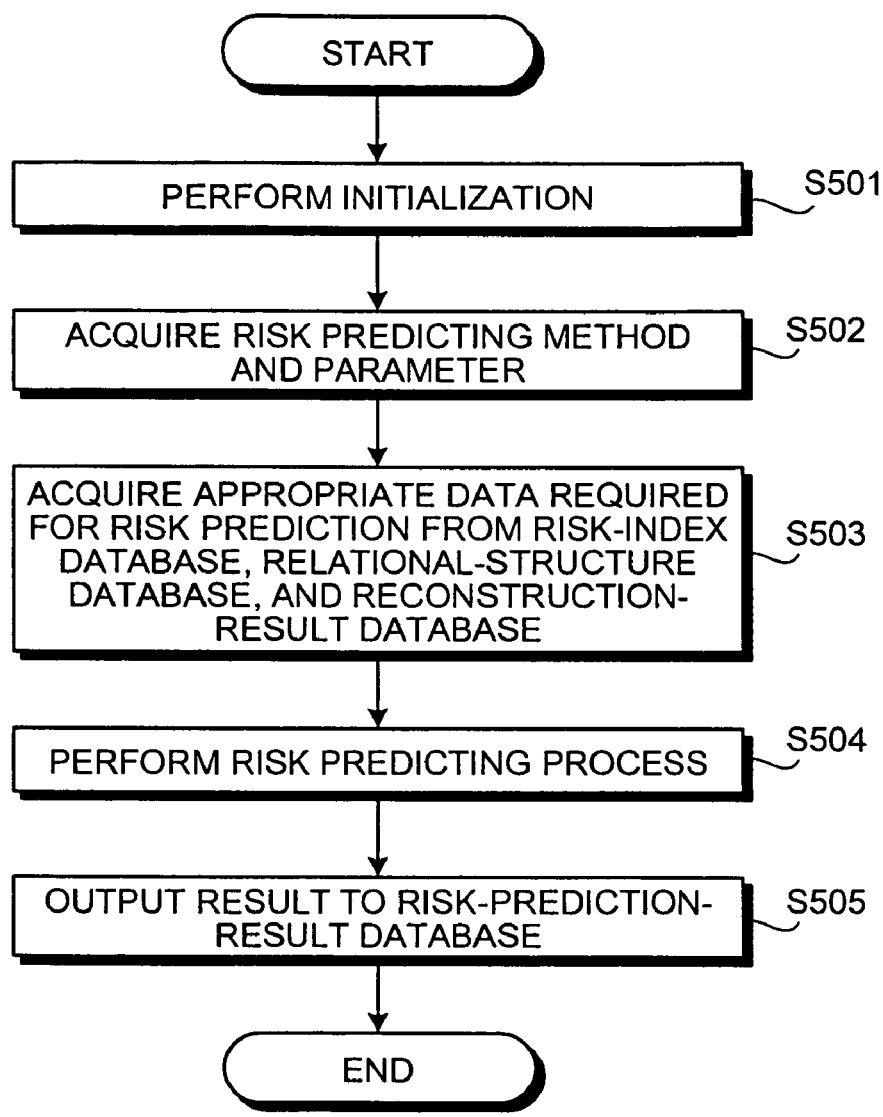

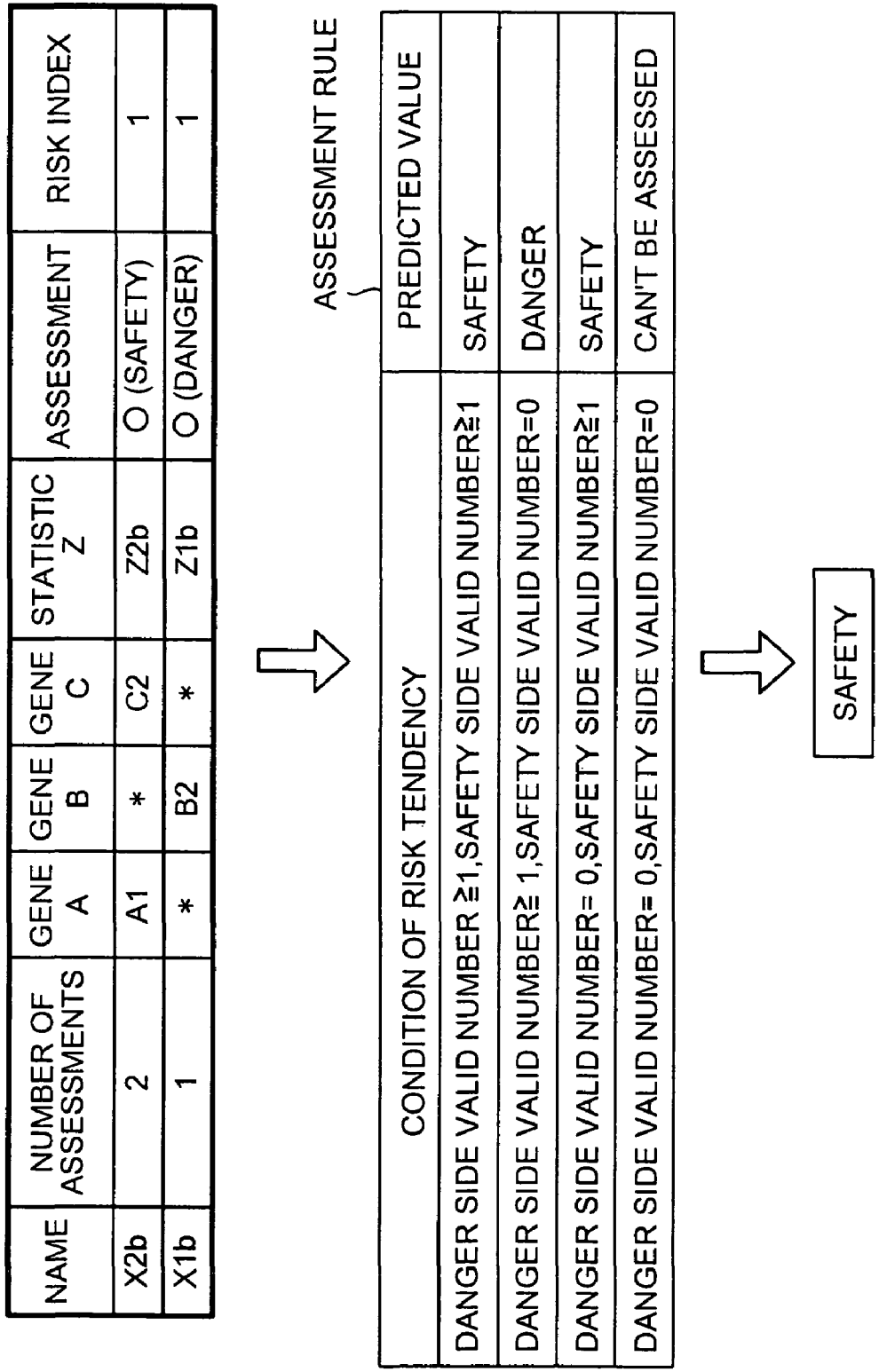

FIG.19

| ID:G003 | | HEIGHT: 175cm | WEIGHT: 85kg | BMI:22 | BODY FAT PERCENTAGE :28% | GENDER: MALE | | ▽ | DISPLAY TEST DATA |
|---|---|---|---|---|---|---|---|---|---|
| NAME: KENKO TARO | | AGE:25 | | NATIONALITY: JAPAN | | PLACE OF RESIDENCE: CHIBA PREFECTURE | | ▽ | DISPLAY GENETIC DATA |

| DISEASE NAME | COMBINATION PATTERN [S1][S2][S3][S4][S5][S6][S7] [BODY FAT PERCENTAGE] | PREDICTED STATE | REFERENCE |
|---|---|---|---|
| DIABETES | [--][AA][--][CG][--][--][--][--][20 - 30] | DANGER: HIGH | St11100 |
| DIABETES | [CG][--][--][TT][--][--][--][--][20 - 30] | DANGER: HIGH | St11100,St111111 |
| OBESITY | [--][--][--][--][CG][AT][--][--][20 - 30] | DANGER: MEDIUM | Ft005,F006 |
| OBESITY | [CG][--][--][--][AT][--][--][--][20 - 30] | DANGER: MEDIUM | Ft005 |
| OBESITY | [--][AA][--][--][AT][--][--][--][20 - 30] | DANGER: MEDIUM | Ft005 |
| OBESITY | [--][--][--][TT][--][AT][--][--][20 - 30] | DANGER: MEDIUM | Ft005,Ft006,Ft007 |
| RHEU-MATISM | [--][--][--][--][--][--][TT][CC][--] | DANGER: LOW | |
| ⋮ | ⋮ | ⋮ | |

| TEST ITEM | TEST RESULT | TESTING PROVIDER | DATE TESTED |
|---|---|---|---|
| HEIGHT | 175 cm | SELF-ASSESSED | 05/05/05 |
| WEIGHT | 85 kg | SELF-ASSESSED | 05/05/05 |
| BMI | 27.75 | SELF-ASSESSED | 05/05/05 |
| BODY FAT PERCENTAGE | 28 % | SELF-ASSESSED | 05/05/05 |
| γ-GTP | 50 IU | OOO HOSPITAL | 04/01/05 |
| LEUKOCYTE | 5500 /μl | OOO HOSPITAL | 04/01/05 |
| NEUTRAL FAT | 153 mg/dl | OOO HOSPITAL | 04/01/05 |
| CHOLESTEROL | 220 mg/dl | OOO HOSPITAL | 04/01/05 |
| ... | | ... | ... |

RETURN

FIG.21

| ID:G003 | | | RETURN |
|---|---|---|---|
| GENE NAME TESTED | BASE SEQUENCE | REFERENCE DATA | |
| S1 | CG | HIX000555,SNP0000003 | |
| S2 | AA | HIX000555,SNP0000004 | |
| S3 | TT | HIX000315,SNP0000111 | |
| S4 | CG | HIX000522,SNP0000123 | |
| S5 | AT | HIX000225,SNP0000044 | |
| S6 | TT | HIX000566,SNP0008868 | |
| S7 | CC | HIX011111,SNP0009999 | |
| S8 | GG | HIX000511,SNP0000021 | |
| ... | ... | ... | |

FIG.22

| | | | | RETURN |
|---|---|---|---|---|
| SELECT ALL | RELEASE ALL | SET | RELEASE | |
| RISK-PREDICTABLE DISEASE NAME | SET PREDICTION | REMARKS: REFERENCE TO RELATED INFORMATION | | |
| DIABETES | O | UPDATED: 2005/01/01 | | |
| OBESITY | O | UPDATED: 2004/01/01 | | |
| RHEUMATISM | O | UPDATED: 2005/02/01 | | |
| ATOPY | O | UPDATED: 2004/11/01 | | |
| ... | | | | |

PREDICTING APPARATUS, PREDICTING METHOD, AND COMPUTER PRODUCT

BACKGROUND OF THE INVENTION

1. Field of the Invention

The present invention relates to a technology for predicting, based on accumulation data in which a correlation between a combination of attribute values and a result of the combination is accumulated, a result of assessment target data including a new combination of the attribute values.

2. Description of the Related Art

In recent years, the research of a prediction system is progressing using a nonlinear analysis method such as a neural network and a support vector machine (SVM). The prediction system using these nonlinear analysis methods is also applicable to events having nonlinearity because the prediction system performs prediction based on learning unlike a prediction system using a conventional simple linear method.

There is a risk prediction system as an example of the prediction system to which the nonlinear analysis method is applied. The risk prediction system predicts risk of occurrence of disease from combinations of genes. There are an enormous number of combination patterns of genes, and there is a nonlinear effect represented by hierarchical genetic population structure. Therefore, an appropriate prediction result can be obtained by the prediction system using the nonlinear analysis method rather than the prediction system using the simple linear method.

Japanese Patent Application Laid-Open No. 2003-004739 discloses a technology of predicting risk of occurrence of disease from combinations of genes using the nonlinear analysis method.

The prediction system using the nonlinear analysis method, however, has a problem such that reliability of prediction is dependent on a process of learning because prediction accuracy is dependent on a learning sequence or the level of learning. Furthermore, the basis of prediction is quite vague, and it is, therefore, difficult to show the clear basis for a prediction result.

Because the prediction of disease risk is affected on life in some cases, it is very important to present the prediction result with high accuracy and clear basis.

SUMMARY OF THE INVENTION

It is an object of the present invention to at least partially solve the problems in the conventional technology.

A computer-readable recording medium according to one aspect of the present invention stores a computer program for predicting, based on accumulation data in which a correlation between a combination of attribute values and a result of the combination is accumulated, a result of assessment target data including a new combination of the attribute values. The computer program causes a computer to execute: structuring including combining an attribute value of the assessment target data with an attribute value indicating a unspecified value, and generating a combination pattern of the attribute values; reconstructing including searching data matching the combination pattern from the accumulation data, and generating subset data; setting an index indicating significance of relationship between the generated subset data with assessment data; and assessing including selecting subset data that becomes a basis of assessment, based on the set index, and performing an assessment on a prediction result based on the selected subset data.

An apparatus according to another aspect of the present invention is for predicting, based on accumulation data in which a correlation between a combination of attribute values and a result of the combination is accumulated, a result of assessment target data including a new combination of the attribute values. The apparatus includes a structuring unit that generates a combination pattern of the attribute values by combining an attribute value of the assessment target data with an attribute value indicating a unspecified value; a reconstructing unit that searches for data matching the combination pattern from the accumulation data, and generates subset data; an index setting unit that sets an index indicating significance of relationship between the generated subset data with assessment data; and an assessing unit that selects subset data that becomes a basis of assessment, based on the set index, and performs an assessment on a prediction result based on the selected subset data.

A method according to still another aspect of the present invention is for predicting, based on accumulation data in which a correlation between a combination of attribute values and a result of the combination is accumulated, a result, of assessment target data including a new combination of the attribute values. The method includes structuring including combining an attribute value of the assessment target data with an attribute value indicating a unspecified value, and generating a combination pattern of the attribute values; reconstructing including searching data matching the combination pattern from the accumulation data, and generating subset data; setting an index indicating significance of relationship between the generated subset data with assessment data; and assessing including selecting subset data that becomes a basis of assessment, based on the set index, and performing an assessment on a prediction result based on the selected subset data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a sample diagram of one example of a data structure of an accumulation database;

FIG. 4 is a sample diagram of one example of a data structure of an individual database;

FIG. 9 is a sample diagram of one example of an output result of the reconstructing unit;

FIG. 11 is a sample diagram of one example of an output result of the risk-assessment-index processing unit;

FIG. 12 is a sample diagram of one example of statistic Z;

FIG. 13A is a conceptual diagram for explaining a concept of the process of adding a risk assessment index;

FIG. 13B is a flowchart of a process procedure for adding the risk assessment index;

FIG. 13D is a sample diagram of another example of the output result of the risk-assessment-index processing unit;

FIG. 14 is a flowchart of a process procedure for a risk assessing unit;

FIG. 15 is a sample diagram of one example of an output result of the risk assessing unit;

FIG. 16 is a sample diagram of one example of the process of predicting risk;

FIG. 19 is a sample diagram of one example of a screen on which a detailed result of risk prediction is displayed for each ID;

FIG. 20 is a sample diagram of one example of a screen on which test data is displayed for each ID;

FIG. 21 is a sample diagram of one example of a screen on which genetic data is displayed for each ID;

FIG. 22 is a sample diagram of one example of a screen on which disease as a risk assessment target is set;

DETAILED DESCRIPTION OF THE PREFERRED EMBODIMENTS

Figure 1:
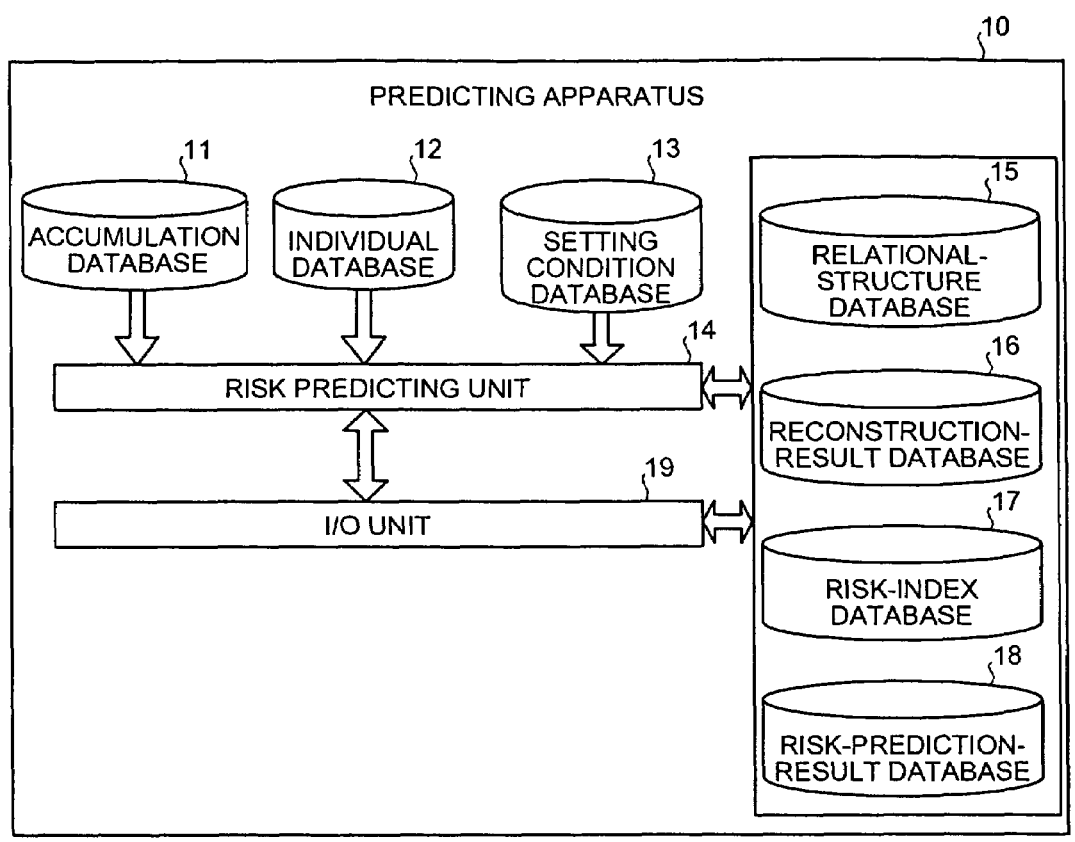
FIG. 1 is a block diagram of a predicting apparatus according to one embodiment of the present invention.

Exemplary embodiments of the present invention are explained in detail below with reference to the accompanying drawings. In the following embodiments, the predicting program and the predicting apparatus according to the present invention are explained when these are used for prediction of disease risk, but the present invention is not limited to the prediction of disease risk. For example, the present invention is applicable to risk assessment in the fields of financing, marketing, insurance, and a like.

In the predicting method according to the present embodiment, disease risk of a particular individual is predicted based on epidemiology data in which genetic information and disease information are accumulated. A gene is a sequence of a plurality of bases, but there is a variation in the sequence, and it is known that a part of the sequence of bases is different for each individual. It is, therefore, considered that a difference in a base sequence may be related to disease risk.

A Single Nucleotide Polymorphism (SNP) indicates a single genetic change, and if one SNP can take two patterns, the total of combinations of 100 SNPs becomes two to the 100th power. This is a digit of about 10 to the 30th power, and it is therefore difficult to analyze even the combinations of only about 100 pieces using a simple counting method. Moreover, in organisms in which the gene is diploid or polyploid, the total is not a simple two's power. For example, when a human being that is diploid has two patterns of SNP (e.g., A/C), because of the diploid, there are three patterns of Homo Type (AA, CC) and Hetero Type (AC), which become a three's power. The method can handle even this case.

In general, it is estimated that there are millions of SNPs on genes per person, and upon analysis of this, it is generally necessary to analyze not only the SNPs but also combinations of a variety of additional information (age, gender, weight, region, past illness, etc.). Therefore, combinations to be checked become enormous, which makes it difficult to previously analyze disease risks of all the combinations in terms of the cost of facilities and the processing time.

A relation between a combination pattern of genes and disease has nonlinearity, and it is, therefore, difficult to obtain an effective analysis result using a linear method such as a simple counting method. It may be possible to analyze the disease risks by using a nonlinear method such as a neural network, but the clear basis for the analysis result cannot be generally presented by the nonlinear method.

How to predict disease risks may be performed using a model as follows. The model is such that a request is received from a client, genetic information of this client is acquired, disease risk is predicted from the genetic information acquired and the accumulation data, and diagnosis and advice are given based on the prediction result. In this case, it is important to present the basis of the prediction result to the client to ensure the reliability of the prediction result for the client.

In the predicting method according to the present embodiment, the accumulation data is dynamically reconstructed according to assessment target data to form subset data. Statistical information or the like is added to the subset data formed, and it is determined how the subset data matches the assessment target data. And prediction is performed based on the subset data with the best match.

The accumulation data is dynamically reconstructed, in the above manner, according to the assessment target data, which allows large reduction in the amount of data to be processed as compared with the case where all the combination patterns are analyzed, thus, shortening the processing time. Furthermore, by performing prediction based on subset data with the best match to the assessment target data, it is possible to perform prediction with clear basis while the nonlinearity that aggregated data has is excluded.

FIG. 1 is a block diagram of a predicting apparatus 10 according to an embodiment of the present invention. The predicting apparatus 10 includes an accumulation database 11, an individual database 12, a setting condition database 13, a risk predicting unit 14, a relational-structure database 15, a reconstruction-result database 16, a risk-index database 17, a risk-prediction-result database 18, and an input/output (I/O) unit 19.

The accumulation database 11 stores epidemiology data including genetic information. The individual database 12 stores data for assessment targets. The setting condition database 13 stores various setting conditions.

The risk predicting unit 14 is a processor that performs risk prediction, based on the accumulation data stored in the accumulation database 11 and the data for assessment targets stored in the individual database 12, according to the setting conditions stored in the setting condition database 13.

The risk predicting unit 14 calculates a risk assessment index by combining data mining techniques such as reconstruction of data, structuring of data, and a statistical and mathematical method. The risk predicting unit 14 outputs the results of the processes to the relational-structure database 15, the reconstruction-result database 16, the risk-index database 17, and the risk-prediction-result database 18. These results are output from the I/O unit 19 as risk assessments for assessment target data, which allows the user to acquire data and also to view the data.

The I/O unit 19 is a processor that inputs or outputs data, and includes a keyboard and a mouse for data entry, and a monitor and a printer for data output.

Figure 2:
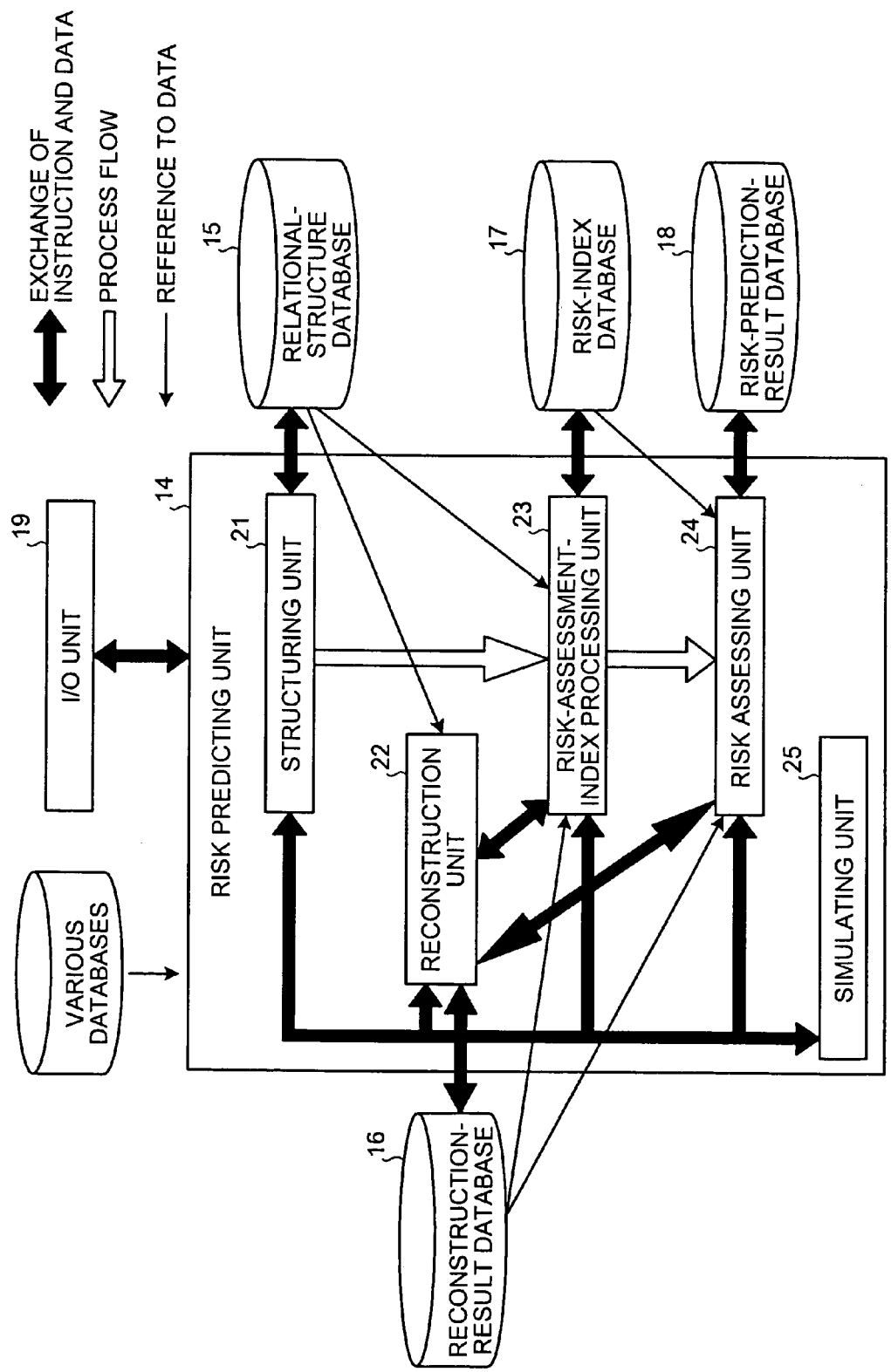
FIG. 2 is a block diagram of a risk predicting unit shown in FIG. 1.

FIG. 2 is a block diagram of the risk predicting unit 14 shown in FIG. 1. The risk predicting unit 14 includes a structuring unit 21, a reconstructing unit 22, a risk-assessment-index processing unit 23, a risk assessing unit 24, and a simulating unit 25.

The structuring unit 21 is a processor that generates combinations of attribute values of the accumulation database 11, according to a predetermined rule. A specific example of the process content of the structuring unit 21 is explained below.

FIG. 3 is a sample diagram of one example of a data structure of the accumulation database 11. The accumulation database 11 includes an identification (ID) for identifying each data and attribute information including a plurality of items. The example of FIG. 3 includes attribute information such as a type of gene A, a type of gene B, a type of gene C, occurrence of disease A, occurrence of disease B, and occurrence of disease C. In FIG. 3, "circle" indicates that the disease occurs and "cross" indicates that the disease does not occur. In addition to these items, various types of attribute information (e.g., age and weight) may be included. Furthermore, although FIG. 3 simply indicates an example that each gene has two patterns at maximum, each attribute information may have two or more patterns. Actually, in the case of a human being, a gene pattern is three or more because the base includes four types and is a diploid.

FIG. 4 is a sample diagram of one example of a data structure of the individual database 12. The individual database 12 includes an ID for identifying each data and attribute information including a plurality of items. The example of FIG. 4 includes attribute information such as the type of gene A, the type of gene B, and the type of gene C, but in addition to these items, various types of attribute information (e.g., age and weight) may be included. Furthermore, each attribute information may have two or more patterns, and all pieces of the attribute information in the individual database 12 and the accumulation database 11 do not necessarily match each other.

In the example of FIG. 4, only one data is present in the individual database 12, but a plurality of data may be included. In this case, a prediction process is executed for each data.

Figure 5:
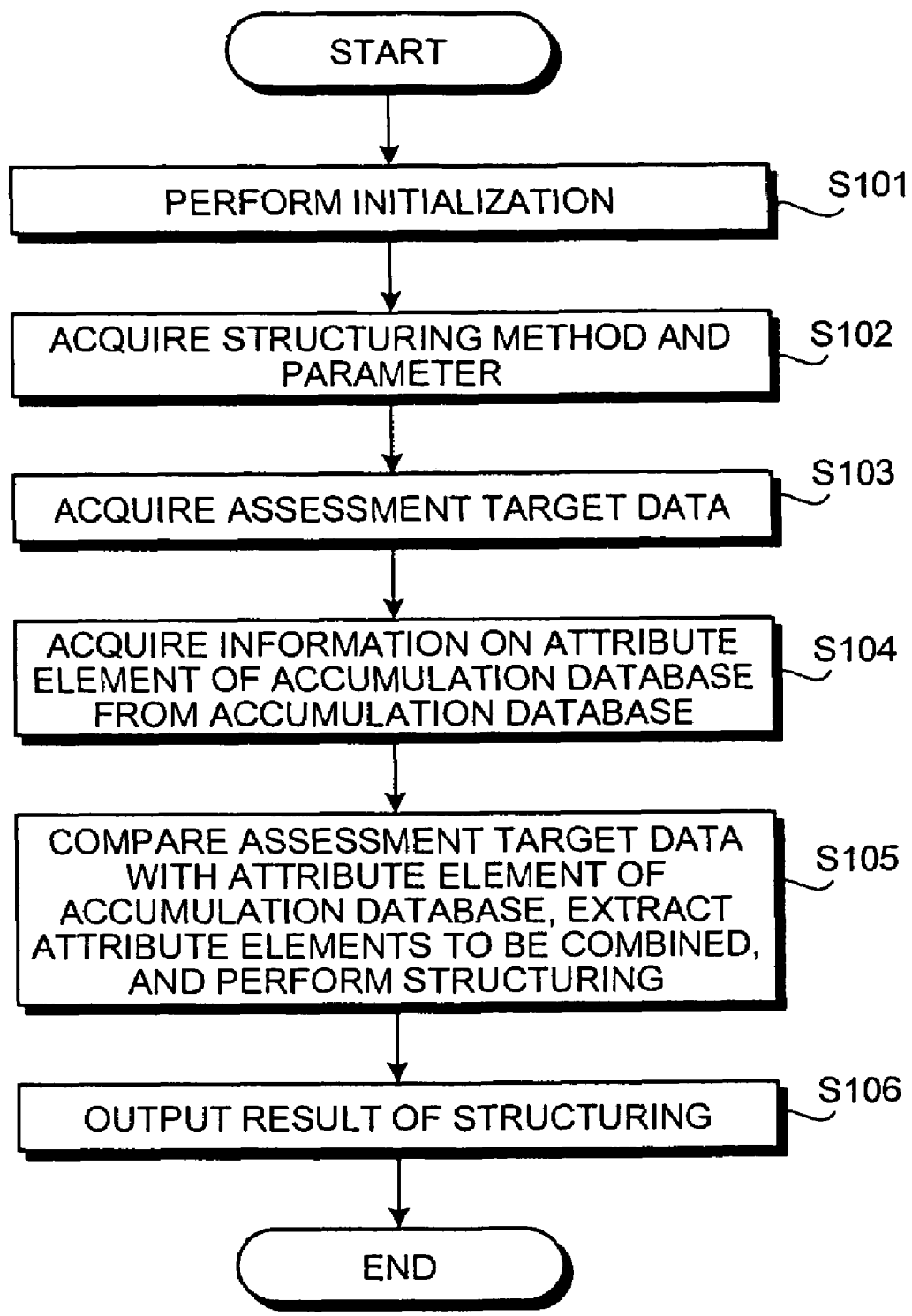
FIG. 5 is a flowchart of a process procedure for a structuring unit.

FIG. 5 is a flowchart of a process procedure for the structuring unit 21. The structuring unit 21 performs a predetermined initialization process (step S101), and then acquires a structuring method and a parameter from the setting condition database 13 or through the I/O unit 19 (step S102). The structuring unit 21 acquires data for an assessment target from the individual database 12 (step S103), and acquires item information for the attribute information from the accumulation database 11 (step S104).

Subsequently, the structuring unit 21 generates a combination of items in the accumulation database 11 according to the method and parameter acquired (step S105), and outputs the result to the relational-structure database 15 (step S106). The processing result may not be output to the relational-structure database 15, but may directly be transferred to a processor as a next process.

Figures 6, 7:
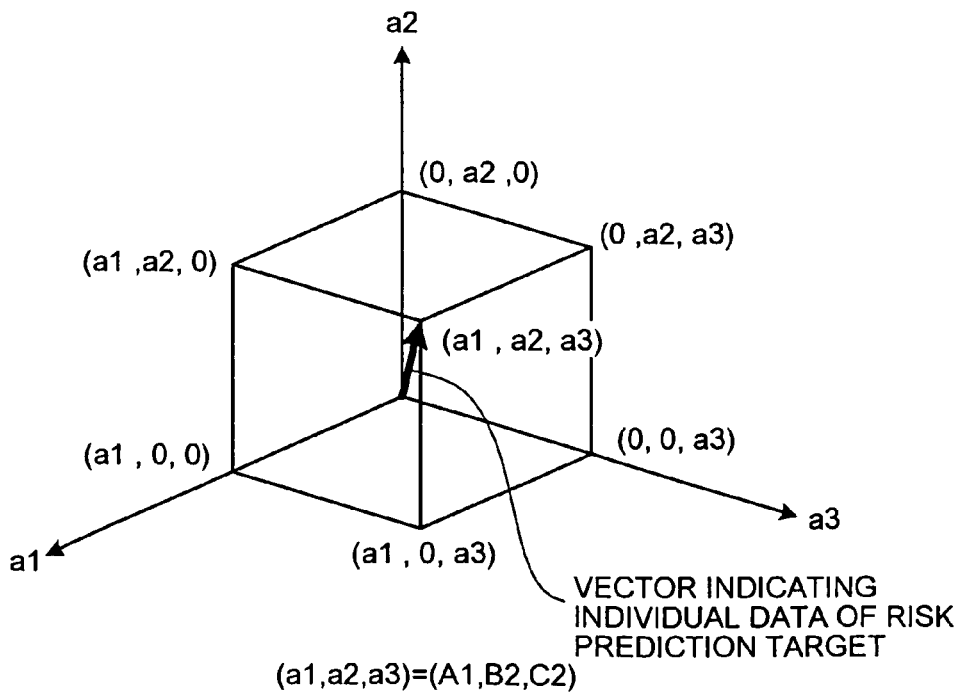
FIG. 6 is a sample diagram of one example of an output result of the structuring unit.
FIG. 7 is a sample diagram for explaining a mathematical meaning of structuring.

FIG. 6 is a sample diagram of one example of an output result of the structuring unit 21. This example indicates a case, as the structuring method, where it is specified so as to express relational structure information using the number of assessed attributes that match (hereinafter, "number of assessments"), and where it is specified as a parameter so as to combine three items of gene A, gene B, and gene C.

In this example, the processing result of the structuring unit 21 consists of "Name", "Number of assessments", and "items to be combined". The "items to be combined" change according to a parameter specified, and in this example, these are gene A, gene B, and gene C.

The "Name" is an identifier to identify each data created by the structuring unit 21. The "Number of assessments" indicates the number of items, among the items to be combined, each of which value matches assessment target data. For example, the data in the first line requires that the value of gene A is "A1", the value of gene B is "B2", and the value of gene C is "C2", and therefore, the number of assessments is 3. The data in the second line requires that the value of gene A is an arbitrary one, the value of gene B is "B2", and the value of gene C is "C2", and therefore, the number of assessments is 2.

A value of the assessment target data for a corresponding item or a mark "*" is set in each item to be combined. The mark "*" indicates that a link between a value of an item and its attribute value is not yet assessed. These data are search conditions used for generating subset data in a subsequent process for reconstruction, and "*" matches any value, that is, "*" functions as a so-called wild card. In this example, all combinations of items with the number of assessments of 0 to 3 are generated, and combinations generated range between a combination in which no items match the values of assessment target data and a combination in which the items perfectly match the values of assessment target data.

An appropriate method can be used as a structuring method, such as various statistics, an mathematical expression, and assignment of names, according to a purpose of process for risk prediction.

FIG. 7 indicates a relational structure using the number of assessments. Each vertex of an n-dimensional (three-dimensional in the example) cube indicates a combination pattern of assessment attributes, and each side of the cube indicates a relational structure between vertices. For example, if (a1, a2, a3)=(A1, B2, C2), (a1, a2, a3) indicates a pattern having the largest number of assessments, and (a1, a2, 0), (0, a2, a3), and (a1, 0, a3) indicate a pattern having a smaller number of assessments than the pattern by one. The mark "*" shown in FIG. 6 corresponds to "0" shown in FIG. 7.

With this structuring, it is made clear how a value of attribute information for an assessment target matches a value of an item and how a link among attribute values in a combination pattern is shown. Because the link of the attribute information to its assessment target data is made 20' apparent, there is no need to perform detailed analysis on a link between attribute values that are not yet assessed, which allows reduction in the calculation amount.

The calculation amount can also be reduced depending on the method of processing (counting the number of counts) used in the risk assessing unit 24, by acquiring a matching pattern of an existing set (subset is not an empty set) from the reconstruction-result database 16 and performing only a process on the pattern other than the empty set.

Referring back to FIG. 2, the reconstructing unit 22 is a processor that generates subset data according to combinations of attribute values generated by the structuring unit 21, and adds statistical data to the subset data. The process content of the reconstructing unit 22 is specifically explained below.

Figure 8:
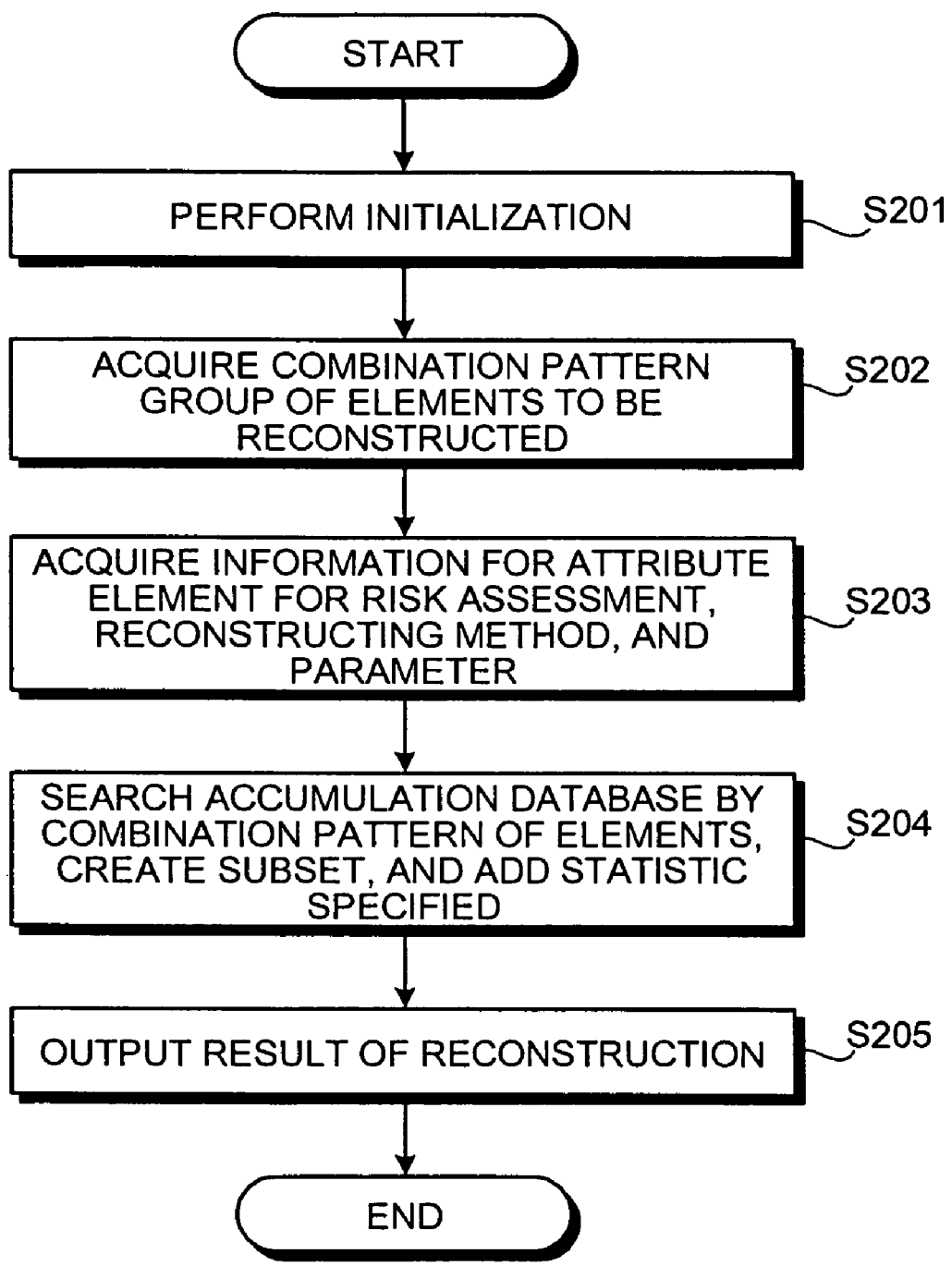
FIG. 8 is a flowchart of a process procedure for a reconstructing unit.

FIG. 8 is a flowchart of a process procedure for the reconstructing unit 22. The reconstructing unit 22 performs a predetermined initialization process (step S201), acquires combination information for attribute values (result of process in the structuring unit 21) from the relational-structure database 15 (step S202), and acquires a method of reconstruction and a parameter thereof from the setting condition database 13 or through the I/O unit 19 (step S203).

The reconstructing unit 22 searches for data from the accumulation database 11 according to the combination information acquired to generate subset data, adds statistical information to the subset data according to the method and parameter acquired (step S204), and outputs the result to the reconstruction-result database 16 (step S205). The processing result may not be output to the reconstruction-result database 16, but may be directly transferred to a processor as a next process.

FIG. 9 is a sample diagram of one example of an output result of the reconstructing unit 22. In this example, there is shown a result of processing the combinations of all attribute values in the relational-structure database 15. If there is no need to process all the combinations at a time, a required reconstruction process may be performed on an individual combination pattern in each case, according to a request from the risk-assessment-index processing unit 23 or the risk assessing unit 24.

Attribute information for use, a specific condition, or statistical information to be added upon reconstruction, of the attribute information, is accepted from a user through the I/O unit 19, or is loaded from the setting condition database 13, or is processed according to an instruction from another processor such as the risk assessing unit 24.

In the example of FIG. 9, the reconstructing unit 22 counts data indicating that "Disease A" occurs (indicated by circle) and data indicating that "Disease A" does not occur (indicated by cross) for each combination shown in FIG. 6, respectively, to obtain statistic Y. The statistic Y indicates, for example, the number of pieces of data, a total of values, and an average value, which are information required for a method used in the risk-assessment-index processing unit 23 in the subsequent stage. In this example, only the statistic Y is added as the statistical information, but a plurality of statistics may be added.

Referring back to FIG. 2, the risk-assessment-index processing unit 23 is a processor that assesses whether the subset data generated by the reconstructing unit 22 and assessment target data match each other. The process content of the risk-assessment-index processing unit 23 is specifically explained below.

Figure 10:
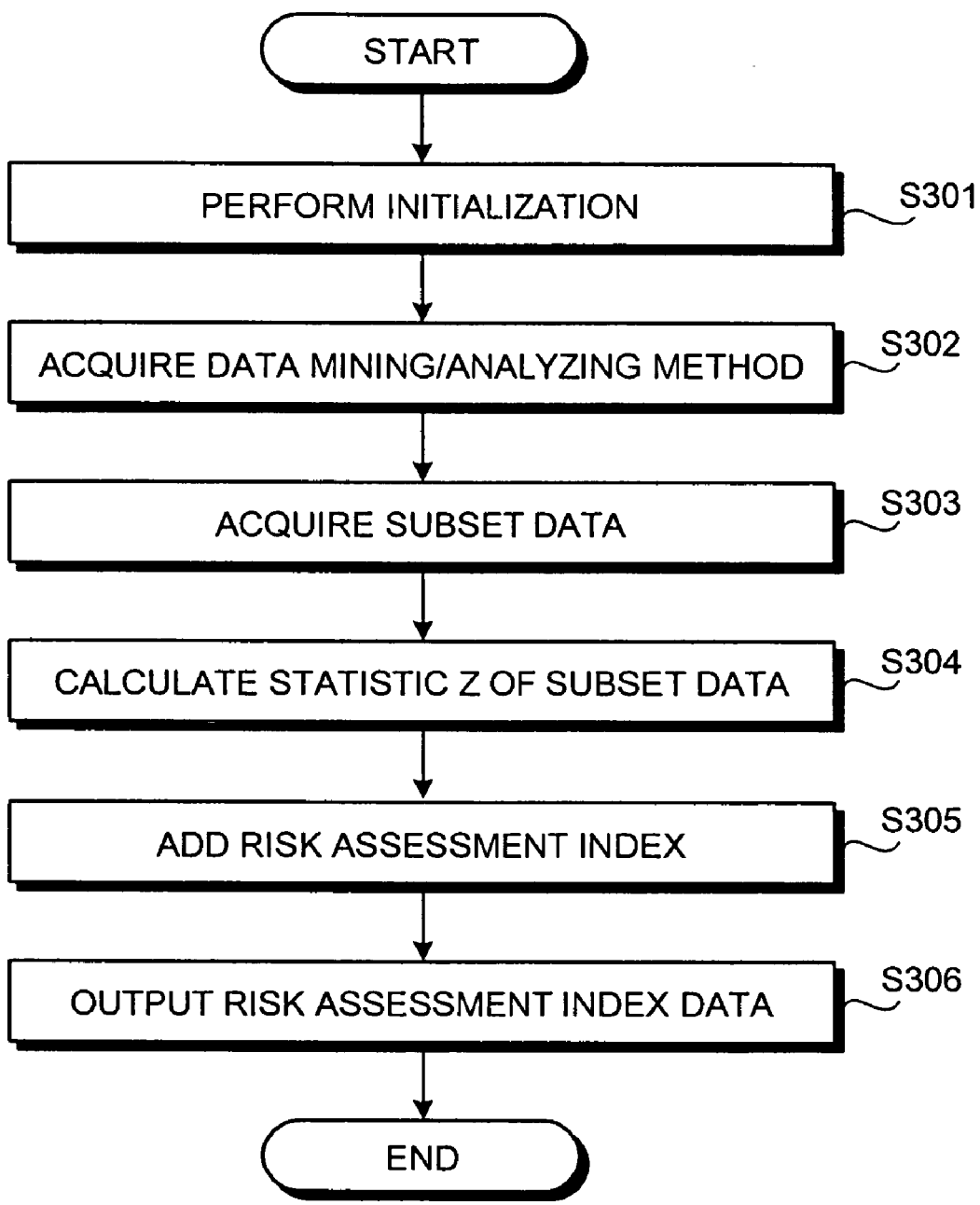
FIG. 10 is a flowchart of a process procedure for a risk-assessment-index processing unit.

FIG. 10 is a flowchart of a process procedure for the risk-assessment-index processing unit 23. The risk-assessment-index processing unit 23 performs a predetermined initialization process (step S301), and acquires a setting method of a risk assessment index and a parameter thereof from the setting condition database 13 or through the I/O unit 19 (step S302).

Then, the risk-assessment-index processing unit 23 acquires subset data from the reconstruction-result database 16 or the like (step S303), calculates statistic Z according to the method and parameter acquired, and sets the result of assessment on whether the statistic Z is statistically valid (step S304). The statistic Z is statistical data for determining whether there is a linkage between a combination of attribute values in the subset data and a target event for prediction ("Disease A" in this example), and, for example, an odds ratio is used. As explained above, a statistical data type required as the statistic Y also changes depending on what kind of statistics method is used to obtain the statistic Z. But, when the odds ratio is used to obtain the statistic Z, the statistic Y indicates the number of pieces of data having the relevant pattern.

Then, the risk-assessment-index processing unit 23 performs the process of adding a risk assessment index, which is explained later, to add the risk assessment index to each subset data (step S305), and outputs the result to the risk-index database 17 (step S306). The risk assessment index is statistical data for assessing whether the subset data and the assessment target data match each other. The processing result may not be output to the risk-index database 17, but may be directly transferred to a processor as a next process.

FIG. 11 is a sample diagram of one example of an output result of the risk-assessment-index processing unit 23. This example indicates the statistic Z for assessing validity of the linkage, an assessment result on validity assessed based on the statistic Z, and a result of adding a risk assessment index indicating whether the subset data is important to assessment target data. In FIG. 11, if a risk assessment index is a smaller number except 0, a combination pattern is closer to the assessment target data, and also indicates that any of combination patterns of which assessment result is valid is more important to the assessment target data.

FIG. 12 indicates an example of using the odds ratio, as the statistic Z, often used in epidemiology. In this example, a 2×2 cross table is created using "combination pattern of values to be processed and a pattern other than the combination pattern" and "two values that can be taken by an attribute of which risk assessment is desired", and statistic Z is calculated. Individual value of the cross table is the number of pieces of data corresponding to a condition and is calculated based on the statistic Y.

More specifically, the risk-assessment-index processing unit 23 acquires first statistic Y (Y3H and Y3P in the example of FIG. 9) and second statistic Y (Y0H and Y0P in the example of FIG. 9) from the reconstruction-result database 16. The first statistic Y is obtained by reconstructing data in a combination pattern to be processed for each attribute related to risk assessment. The second statistic Y is such that a combination pattern is not assessed at all. As a result, the 2×2 cross table {=A, B, C, D} shown in FIG. 12 is obtained, and statistic Z is calculated. In this example, the statistic Z can be an odds ratio ($Z3o$) and a confidence interval ($Z3r+$, $Z3r-$).

A statistical method other than the odds ratio sometimes requires data other than data in the accumulation database 11. In this case, the data may be previously recorded in the setting condition database 13 when needed and be acquired. For example, the case of Bayesian statistics requires information for prior distribution, and the information, therefore, needs to be acquired as external data from the setting condition database 13 or through the I/O unit 19.

The process of adding a risk assessment index of FIG. 10 is explained below. The risk assessment index to be added in this process is characterized in that it is set so as to be assessed as being statistically valid and to have precedence over a pattern in which a matching situation of values of an attribute is high.

FIG. 13A is a conceptual diagram for explaining a concept of the process of adding the risk assessment index. In FIG. 13A, similarly to FIG. 7, each combination pattern of attribute values is set as each vertex of an n-dimensional (three-dimensional in the example) cube, and further, statistical validity/invalidity shown in FIG. 11 is added to each vertex.

The risk assessment index is always zero (0) for a statistically invalid combination pattern. For a statistically valid combination pattern, if a pattern does not include other valid combination patterns, the pattern becomes a smaller value. In other words, if the risk assessment index is 1 or higher but smaller among the values, this indicates a more highly matching situation of a combination pattern. Furthermore, if the assessment result is valid (statistically significant), this indicates a combination pattern of elements which are valid and important to assessment target data.

For example, a valid pattern of (A1, 0, C2) does not include another valid combination pattern, and hence, the risk assessment index becomes 1. Likewise, the risk assessment index of a valid pattern of (0, B2, 0) also becomes 1. However, because a valid pattern of (A1, 0, 0) includes the valid pattern of (A1, 0, C2), the matching situation of attributes becomes low, and the risk assessment index becomes 2. This is because a coordinate value of 0 indicates "*", which includes all values that can be taken.

Both (0, B2, 0) and (A1, 0, 0) are valid patterns and have the same number of assessments of 1. However, because (0, B2, 0) does not include another valid pattern, the value of the risk assessment index is made smaller than the other, and therefore, it is determined that the matching of this pattern to assessment target data is higher.

Whether another valid pattern is included can be determined depending on whether any vertex indicating another valid pattern is present along a path up to a vertex which fully coincides with a target pattern for assessment, in the diagram shown in FIG. 13A. (A1, 0, C2) and (0, B2, 0) have no vertices indicating other valid patterns present along respective paths up to (A1, B2, C2), but (A1, 0, 0) has (A1, 0, C2) along the path.

FIG. 13B is a flowchart of a process procedure for adding the risk assessment index. At first, risk assessment indexes for all data are cleared to 0 (step S401).

One reconstructed data is acquired (step S402). If the assessment result on statistical validity of the data is not valid (step S403, No), it is checked whether there is any data which is not acquired at step S402. If there is any (step S411, Yes), the process returns to step S402, but if all the data are already acquired at step S402 (step S411, No), then the process is ended.

If the assessment result on statistical validity of the data acquired at step S402 is valid (step S403, Yes), the risk assessment index of the data is incremented by one (step S404).

Then, one reconstructed data is acquired (step S405). Here, if the data acquired at step S405 is not the same data as the data acquired at step S402 (step S406, No), and if it is statistically valid (step S407, Yes), and includes the data acquired at step S402 (step S408, Yes), the risk assessment index of the data acquired at step S405 is incremented by one (step S409).

After step S406 to step S409, it is checked whether there is any data that is not acquired at step S405. If there is any (step S410, Yes), the process returns to step S405. But, if all the data are already acquired at step S405 (step S410, No), then the process proceeds to step S411.

When the process proceeds to step S411, it is checked whether there is any data that is not acquired at step S402. If there is any (step S411, Yes), the process returns to step S402. But, if all the data are already acquired at step S402 (step S411, No), then the process is ended.

Figure 13C:
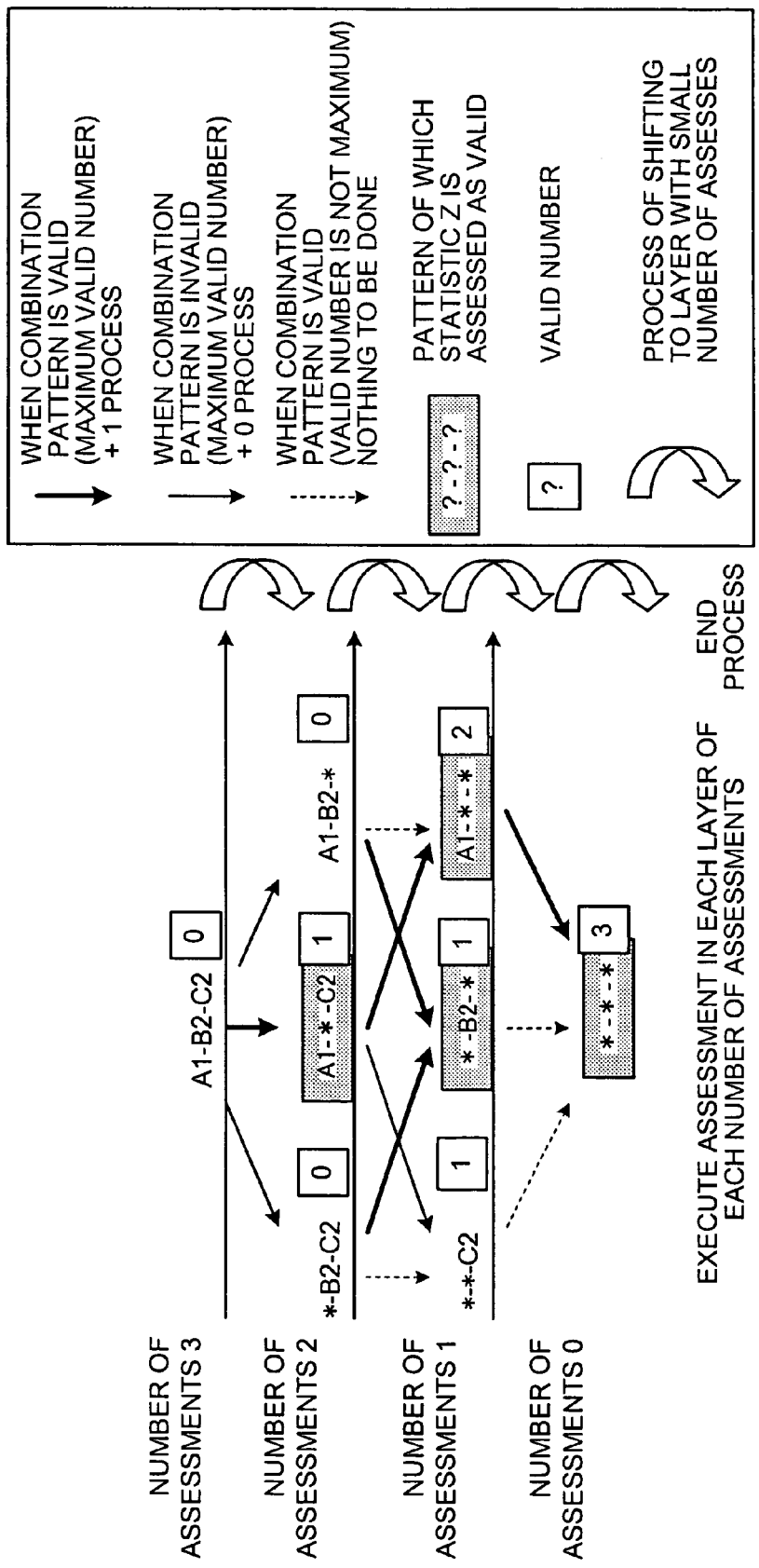
FIG. 13C is a sample diagram of another process procedure for adding the risk assessment index.

FIG. 13C is a sample diagram of another process procedure for adding the risk assessment index. In the process of adding the risk assessment index, the process of risk assessment may be performed in descending order from a layer having a large number of assessments according to a relational structure.

According to the present embodiment, as a calculation method of the risk assessment index, there is shown the example of calculating it from the valid number on upstream side of the path (including target data) and the validity of target data. The calculation method is performed by calculating the valid number of the target data and calculating a risk assessment index from the valid number. More specifically, among a plurality of paths from a start point (state vector of a patient: see FIG. 7) which is located on an upstream position of the data to be processed, the valid number on the paths where the maximum valid states are present is acquired.

If the target data itself is valid, one is added to the valid number, but if it is invalid, no value is added. The processing result obtained in the above manner is determined as the valid number of the target data to be processed. Then, if the target data to be processed is valid, the valid number is multiplied by 1, and if it is invalid, the valid number is multiplied by 0, and the result of multiplication is set as a risk assessment index.

If there are no combination patterns having the same number of assessments in a layer or if the risk assessment index is already added, a combination pattern group in a lower layer is acquired, and the same assessment process is performed. The combination pattern group has a smaller number of assessments than that of the combination patterns by one. The process is repeated until a pattern required for the risk assessing unit 24 is obtained. One example of results of the process for adding the risk assessment index is shown in FIG. 3D when the process is performed in the above manner.

For example, when only the data of which risk assessment index is up to 1 is used in the process of the risk assessing unit 24, a combination in which the risk assessment indexes are 1 can be obtained if the process is finished at the point in time at which there is no 0 in all the paths. As a result, there is no need to process the whole combinations, which also allows further reduction of the amount to be processed by the computer.

A variety of algorisms can be used for the process for adding the risk assessment index, according to a method of expressing a relational structure, properties of data of attribute elements (continuous quantity/discrete quantity, etc), a risk assessment method, and a statistical and mathematical method to be combined. However, when any of the algorisms is used for the predicting apparatus according to the present embodiment, a combination pattern of attribute information may be set so that the combination pattern is close to the assessment target data, and so that the risk assessment index of data, of which linkage is statistically more valid, has higher precedence than that of other data. In this case, when there is an inclusive relation in a combination of attribute elements between valid combination patterns, it is necessary that a combination of a large set with a large number of assessments is determined as being precedent over other combinations.

Actually, in the examples of processes shown in FIG. 13B and FIG. 13C, a value of the risk assessment index is different from that of a combination included in the target data to be processed. In the case of FIG. 13B, the risk assessment index of +1 is added to the number of all valid combination patterns (valid number) included in a combination pattern in the target data to be processed. In the case of FIG. 13C, "1" is added to the valid number (maximum valid number) of paths which is a maximum valid number in valid combination patterns included in a plurality of paths from a start point indicated by a state vector to a certain combination pattern. In both cases, the closest valid example to a combination of attributes of target data becomes 1.

It may be configured so that a statistical method used in the risk-assessment-index processing unit 23 can be acquired from the setting condition database 13 and the user can select a statistical method for any purpose. Validity can be assessed by combining a statistical test method such as $\chi$-square test and an ordinary method such as Bayesian statistics, other than the odds ratio used in this method.

Referring back to FIG. 2, the risk assessing unit 24 is a processor that performs risk assessment of assessment target data based on the processing results of the structuring unit 21, the reconstructing unit 22, and the risk-assessment-index processing unit 23. A specific example of the process content of the risk assessing unit 24 is explained below.

FIG. 14 is a flowchart of a process procedure for the risk assessing unit 24. The risk assessing unit 24 performs a predetermined initialization process (step S501), and acquires a method of risk assessment and a parameter thereof from the setting condition database 13 or through the I/O unit 19 (step S502).

The risk assessing unit 24 acquires required data from the relational-structure database 15, reconstruction-result database 16, and the risk-index database 17 (step S503), performs risk prediction based on the data acquired (step S504), and outputs the result to the risk-prediction-result database 18 (step S505). The processing result may not be output to the risk-prediction-result database 18, but may be output to the I/O unit 19 or may be transferred to another processor.

FIG. 15 is a sample diagram of one example of an output result of the risk assessing unit 24. In this example, a pair of data such as an ID for identifying a prediction result and the prediction result is output. Subset data or the like which is the basis for the prediction may also be included in the result to be output.

The method of the prediction process performed at step S504 is decided using the method acquired at step S502, but the method may be any type. The example of the reconstructing process is shown in FIG. 16.

In this example, the prediction is performed using data of which risk assessment index is 1 (most important) and which satisfies the condition in which the confidence interval is set. Moreover, the prediction is performed based on a predetermined assessment rule. More specifically, if there is even one valid data in a safety side, it is determined as "Safety". If there is no valid data in the safety side but if there is even one valid data in a danger side, then it is determined as "Danger". If there is neither valid data in the safety side nor valid data in the danger side, then it is determined as "Can't be assessed". The assessment rule may be changed according to a target and a purpose of prediction.

The present embodiment shows a simplest assessment example, but a complex assessment rule may be set allowing for a state where the risk assessment index is 2 or less. In this case, as explained above, because a value of the risk assessment index of 2 or higher is made different according to the process procedure for adding a risk assessment index, the assessment rule may be changed according to the process for adding a risk assessment index.

In the predicting method according to the present embodiment, the prediction is performed based on the data, among the subset data generated by reconstruction, which is determined that the data has a high similarity to the assessment target data and a combination of attribute values is statistically valid. This allows prediction by using a normal method without using an advanced method such as the nonlinear method. Furthermore, the subset data or the like used for the prediction and the result of analysis are presented, and the clear basis of the prediction can thereby be presented.

In this example, the prediction is performed using the odds ratio obtained by the risk-assessment-index processing unit 23, but the risk assessment can also be performed by obtaining a tendency of risk using a method such as the Bayesian statistics and a multivariate method. In the present embodiment, both the risk-assessment-index processing unit 23 and the risk assessing unit 24 process the validity and the tendency of risk (risk rate) using a single odds ratio. But, a plurality of methods may be combined to perform the process according to property of data for a population to be processed.

There is no need to perform the sequence of processes in the structuring unit 21, the reconstructing unit 22, and the risk-assessment-index processing unit 23 in this order as explained in the present embodiment, and hence, the sequence can also be changed according to the purpose of processes.

Referring back to FIG. 2, the simulating unit 25 is a processor that performs simulation such as changing of a setting condition and repetition of prediction processes until a result of risk prediction or statistical information obtained becomes a specified condition.

Figure 17:
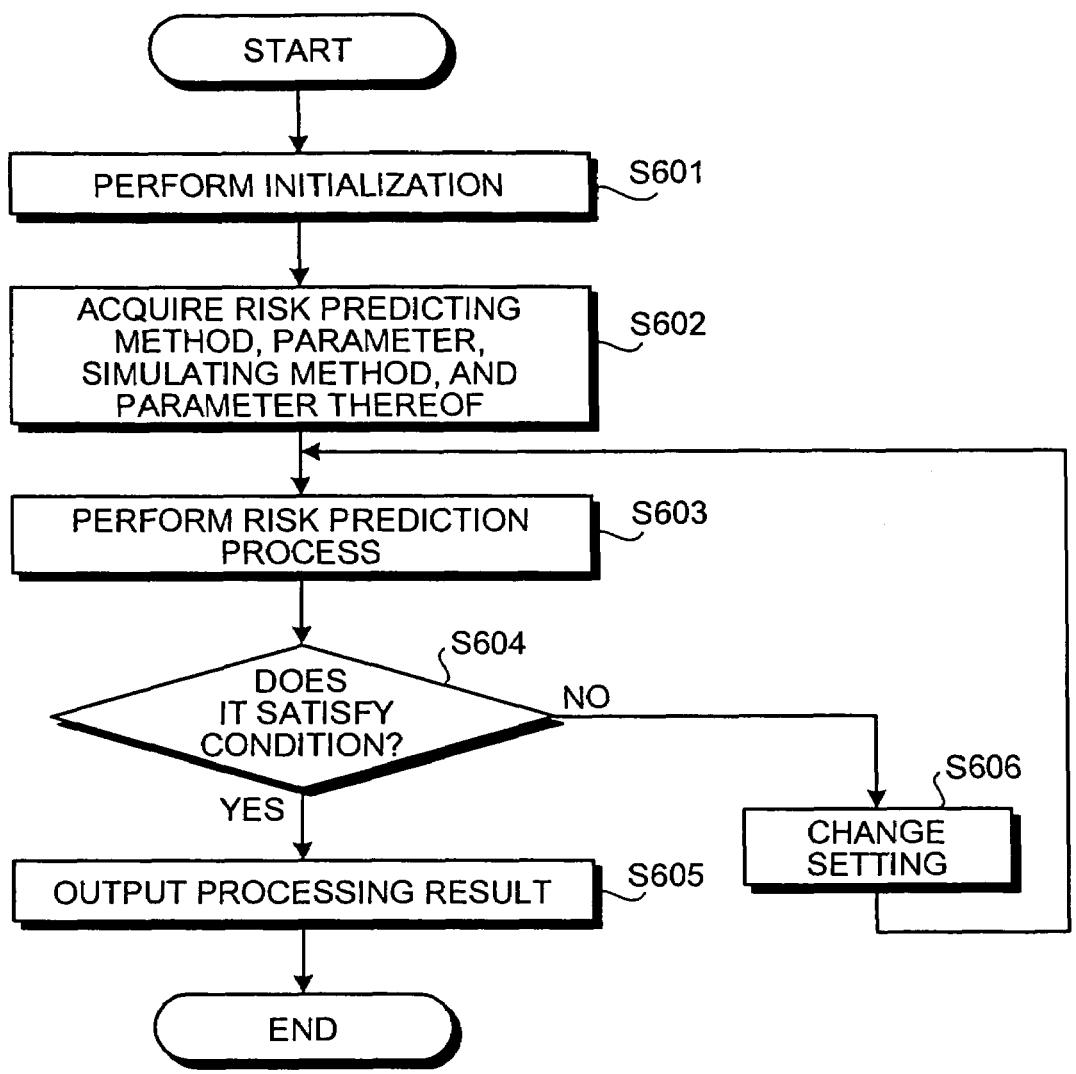
FIG. 17 is a flowchart of a process procedure for a simulating unit.

FIG. 17 is a flowchart of a process procedure for the simulating unit 25. The simulating unit 25 performs a predetermined initialization process (step S601), and acquires processing methods for processors and parameters thereof from the setting condition database 13 or through the I/O unit 19 (step S602).

The simulating unit 25 causes the structuring unit 21, the reconstructing unit 22, the risk-assessment-index processing unit 23, and the risk assessing unit 24 to perform the processes using the methods and the parameters acquired, to obtain the result of prediction (step S603). If the processing result satisfies the condition acquired at step S602 (step S604, Yes), the simulating unit 25 outputs the result and ends the process (step S605).

If the processing result does not satisfy the condition acquired at step S602 (step S604, No), the simulating unit 25 resets the parameter based on the information acquired at step S602 (step S606), and the process returns to step S603, where the prediction process is executed again.

The condition to be assessed at step S604 can be set as the following ones, such as a condition that the prediction result is not "Can't be assessed" and a condition that the value of the risk assessment index is 1 and all the data assessed as valid are valid in either one of a danger direction and a safety direction. Further, in the reset of the parameter at step S606, changes are performed in such a manner that criteria of validity are made tightened or relaxed.

By repeating prediction in the above manner until the prediction meets the condition specified, an appropriate assessment process can automatically performed without setting the parameter while repeating the process of trial and error of the parameter. Thus, a high-quality prediction result can be obtained.

An example of a user interface in the I/O unit 19 is shown below. The user interface is used when a user performs various settings or refers to results of risk prediction or the like.

Figure 18:
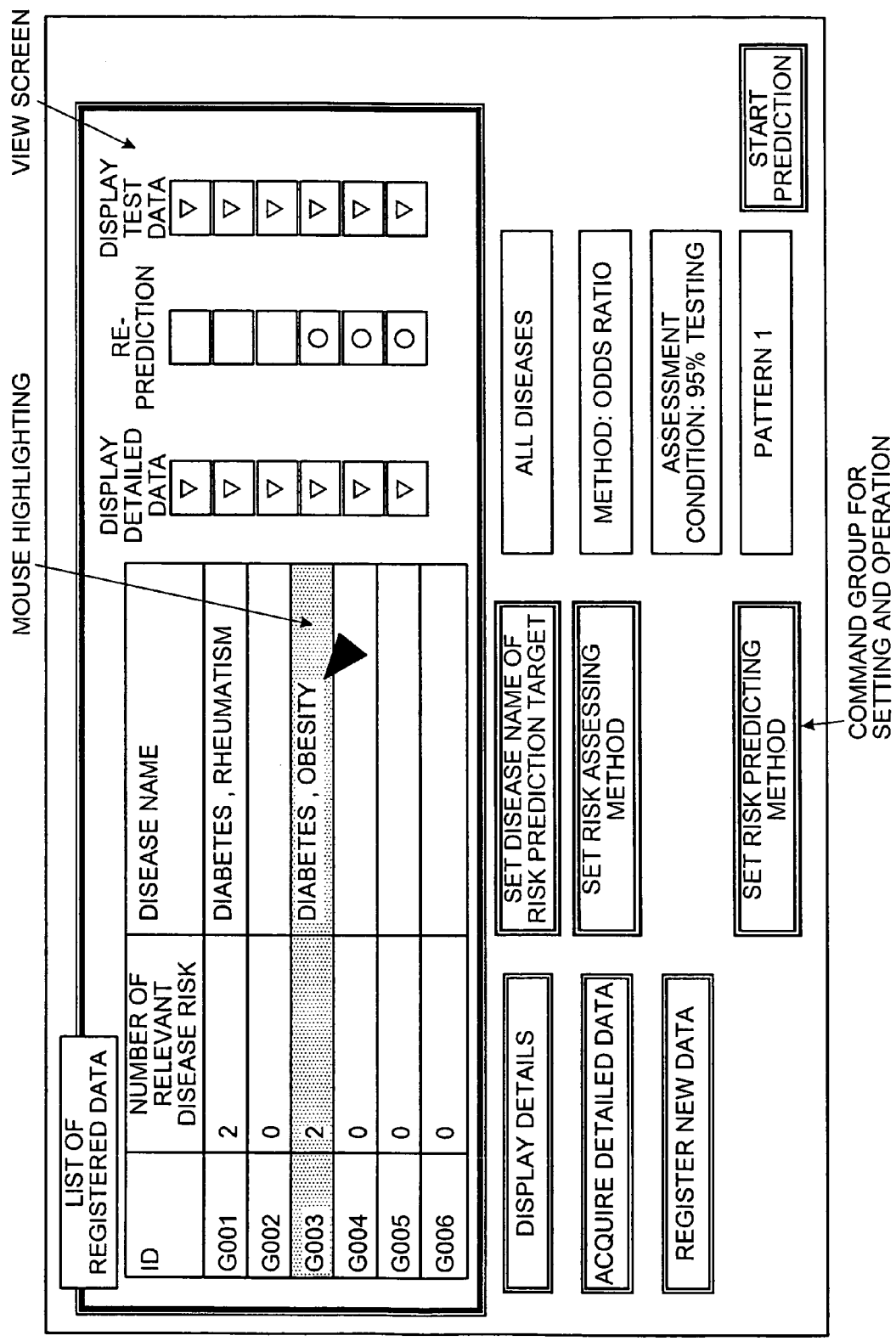
FIG. 18 is a sample diagram of the whole screen and a list of results of registered data on a view screen.

FIG. 18 is a sample diagram of the whole screen and a list of results of registered data on a view screen. Displayed on the view screen are IDs of assessment target data of which risk prediction is desired to be preformed, results of risk prediction (number of relevant disease risks, disease name) and detailed data thereof, and a link button to test data registered and the like. Furthermore, re-assessment target used when the set value is changed to perform re-prediction is also shown thereon. By referring to this screen, the user can get to know about risk diseases or the like. A mouse or so is used to enable an operation.

The processing result displayed on the screen is a result of repeatedly executing the process of prediction for each assessment target data and for each disease that is desired to be predicted.

The screen has a "DISPLAY DETAILS" button for displaying details for each ID, an "ACQUIRE DETAILED DATA" button for acquiring data as a digital file, a "REGISTER NEW DATA" button for registering new data, a "SET DISEASE NAME OF RISK PREDEICTION TARGET" button for setting a disease or the like of which risk is desired to be predicted, a "SET RISK ASSESSING METHOD" button for setting a method to perform risk assessment, a "SET RISK PREDICTING METHOD" button for setting a condition under which risk prediction is performed, and a "PREDICTION START" button for starting risk prediction based on the user settings. Moreover, a part of the current set status (setting result of disease as risk assessment target, setting result of the risk assessment method, setting result of the risk predicting method) is displayed on the screen, so that user-friendliness can be achieved.

FIG. 19 is a sample diagram of one example of the screen on which a detailed result of risk prediction is displayed for each ID. The link for detailed display, or mouse highlighting and the "DISPLAY DETAILS" button is used to enable display of the screen. In this example, ID, and various types of attribute values of assessment target data indicated by ID (height, weight, body fat percentage, and gender) are displayed on the upper part of the screen. Furthermore, names of diseases of which risk is predicted, a combination pattern of attributes which is evidence indicating the risk, a prediction result, and additional information (reference), and the like are displayed in the center thereof in a list form, so that the user can obtain the detailed basis of the risk prediction.

Family name, age, nationality, and place of residence of assessment target data can be displayed. These data are directly changeable on the screen, so that the data can be updated or edited. In addition to this, there are link buttons for displaying various types of test data and genetic data, which allows data used to be called immediately. If other risks, for example, marketing, are to be predicted, "Name of risk disease" is changed to "Goods/service with purchase possibility", and a combination pattern is replaced with a combination of questionnaire and buying history.

FIG. 20 is a sample diagram of one example of a screen on which test data is displayed for each ID. These data are shown as an example of so-called physiological test, and various Test items, Testing provider, Date tested, and the like can be recorded therein. Furthermore, a display item can be edited or updated on the screen. If the testing is performed not for risk prediction of disease but for other risks to be predicted, for example, marketing, personal information and the like can be recorded therein instead.

FIG. 21 is a sample diagram of one example of a screen on which genetic data is displayed for each ID. This view screen shows Gene name tested, Test result (base sequence), and Reference data (relevant gene and names of SNPs). Furthermore, a link etc. of data on a public network may be shown for the relevant gene and SNPs.

A gene tested can be edited or updated on the view screen. In this example, genetic information and test data are provided as separate items. But the items are separated simply for convenience because the genetic information has an enormous amount of data, and therefore, commoditization is also possible.

FIG. 22 is a sample diagram of one example of a screen on which disease as a risk assessment target is set. This screen includes a "SELECT ALL" button indicating a state where all diseases of which risk prediction is performed are selected, a "RELEASE ALL" button indicating a state where nothing is selected, a "SET" button for setting whether risk prediction is performed for each item, and a "RELEASE" button.

A list is displayed on the screen. The list includes "Risk predictable disease name", "Set prediction" indicating a setting state as to whether prediction is performed, and "Remark: related reference" indicating various additional information. Risk predictable data depends on epidemiology data on the system, and hence, a name of risk predictable disease can automatically be displayed on the system side. This example shows an example of setting so as to predict all the risk predictable diseases. When this screen is used for marketing, a "disease name" is simply replaced with "purchase predictable goods/service" or the like.

Figure 23:
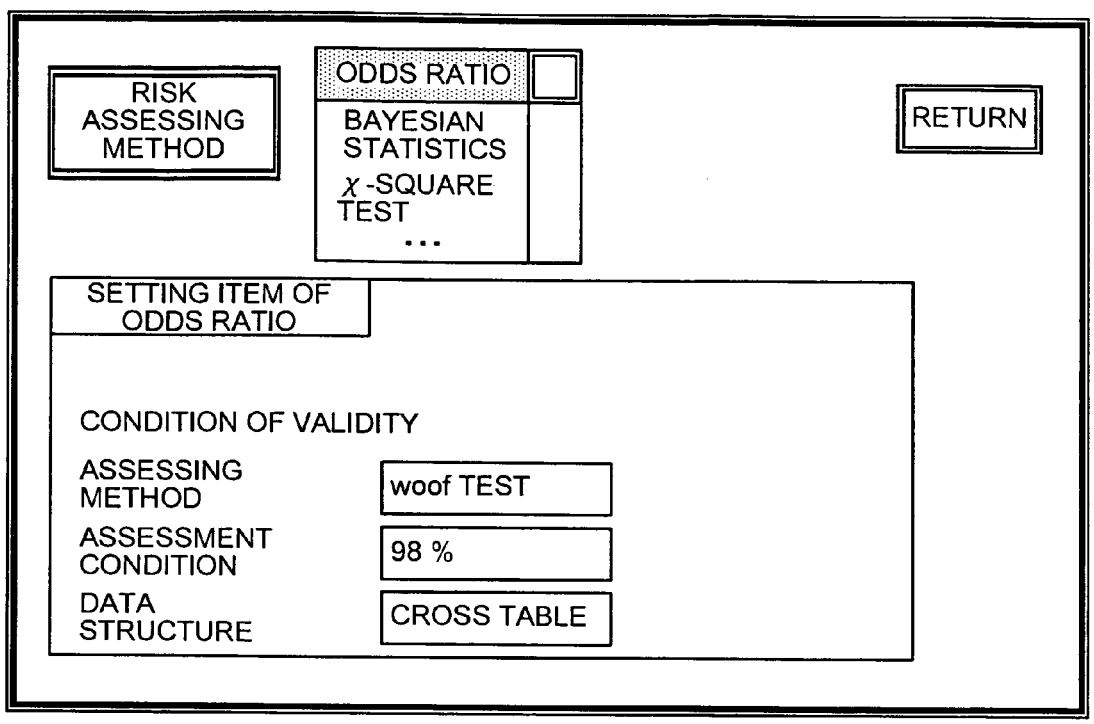
FIG. 23 is a sample diagram of one example of a screen on which a risk assessment method required for risk prediction is set.

FIG. 23 is a sample diagram of one example of a screen on which a risk assessment method required for risk prediction is set. The screen includes a selection area for selecting a risk assessment method and a sub-window showing various setting items for each risk assessment method. In the sub-window, a display can be switched to another according to the selection content of the selection area.

In this example, the odds ratio is selected in the selection area, and the sub-window shows a method for assessing validity and a method of structuring condition of assessment and data and the like. The user can select a data analysis/analysis method used for risk assessment by using the interface, and can set an assessment condition, a method, and the like. This allows risk assessment by combining general-purpose statistical and mathematical data analysis/analysis methods based on user selection.

Figure 24:
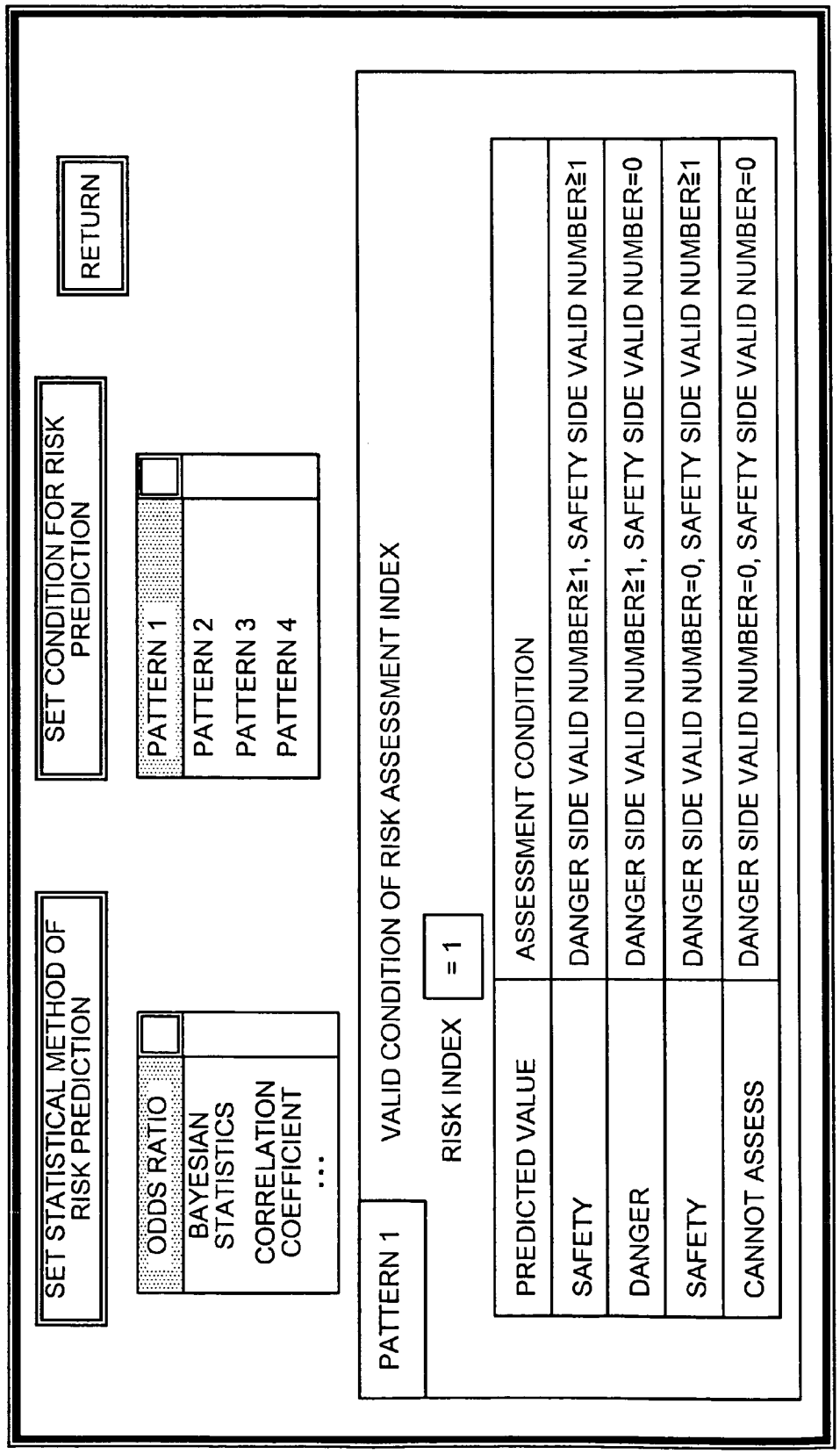
FIG. 24 is a sample diagram of one example of a screen on which conditions required for risk prediction are set.

FIG. 24 is a sample diagram of one example of a screen on which conditions required for risk prediction are set. A statistical method required for risk prediction and a correlation between a risk analysis pattern obtained from a result of applying the method and risk prediction can be specified on the screen. As shown in FIG. 24, it is also possible to set assessment using mathematical expression for setting conditions.

It should be noted that this method is not the same as the risk assessment method shown in FIG. 23. The odds ratio and the Bayesian statistics can indicate the tendency of risk by a rate of risk and a probability, and can also indicate reliability. In the risk assessment, it is important to check the reliability, and in risk prediction, it is important to show the tendency of risk. Therefore, the method, such as the $\chi$-square test that is adapted only to the reliability, cannot be used for the risk prediction. Furthermore, even if the method such as the odds ratio and the Bayesian statistics can be used for both of the cases, it is sometime better to separately use the methods depending on data. Therefore, the methods can be separately set in the present embodiment.

The various processes of the predicting apparatus 10 explained in the present embodiment can be implemented by executing a previously prepared predicting program by a computer. Therefore, one example of a computer for executing the predicting program is explained below with reference to FIG. 25.

Figure 25:
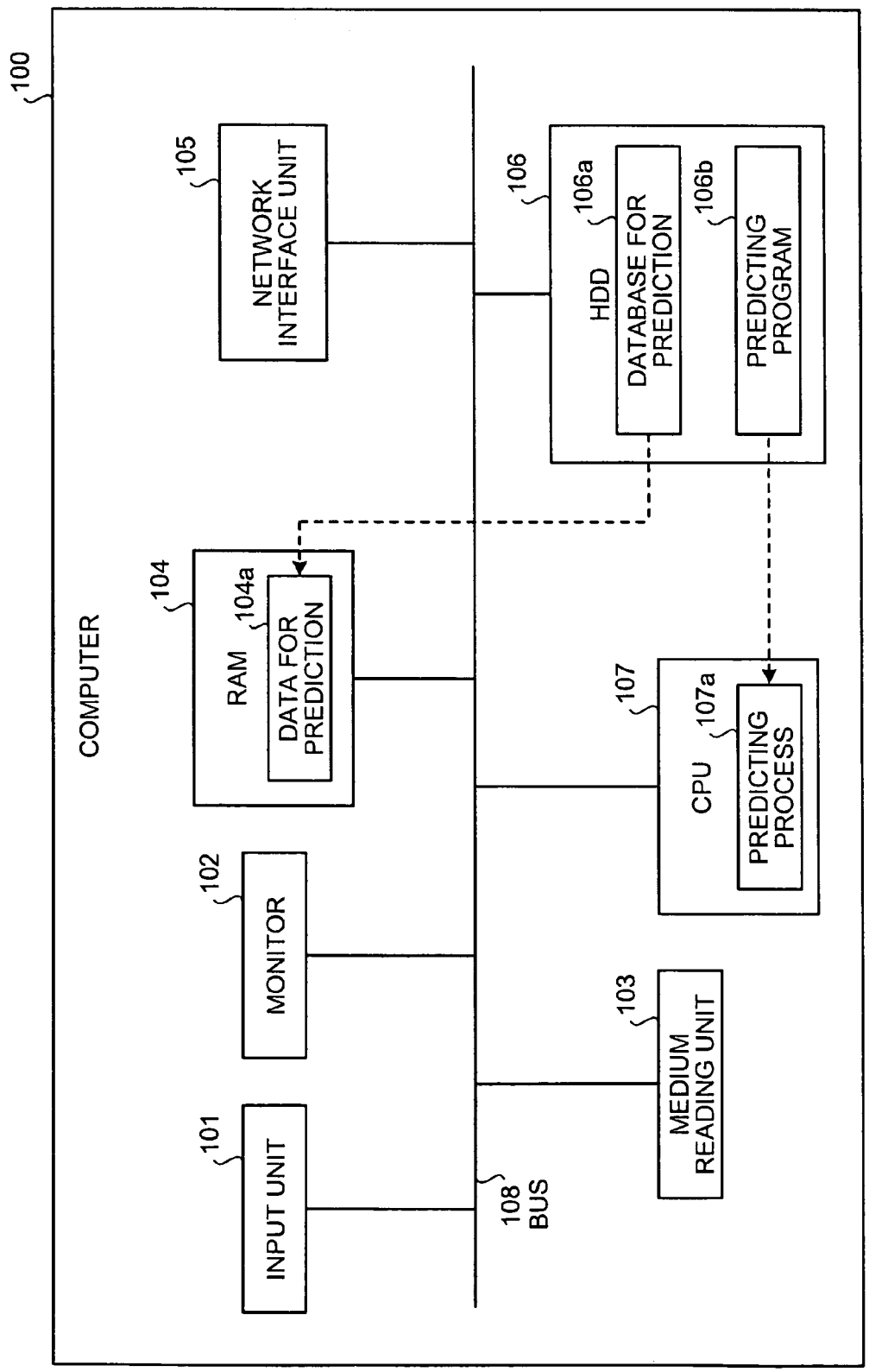
FIG. 25 is a functional block diagram of a computer for executing a predicting program.

FIG. 25 is a functional block diagram of a computer 100 for executing a predicting program. The computer 100 includes an input unit 101 that accepts an input of data from a user, a monitor 102, a medium reading unit 103 that reads a program from a recording medium with various programs recoded, a random access memory (RAM) 104 that temporarily stores various types of information, a network interface unit 105 that exchanges data with other computers through a network, a hard disk drive (HDD) 106, and a central processing unit (CPU) 107, which communicate with one another through a bus 108.

The HDD 106 stores a predicting program 106b which is a program for fulfilling a function the same as that of the predicting apparatus 10. The HDD 106 also stores a database for prediction 106a corresponding to the databases including the accumulation database 11 through the risk-prediction-result database 18 of FIG. 1.

The database for prediction 106a may be arranged in such a manner as integration or distribution thereof when needed.

The CPU 107 reads the predicting program 106b from the HDD 106 to execute it, which allows the program to function as a prediction process 107a. The prediction process 107a corresponds to the risk predicting unit 14 shown in FIG. 1.

Furthermore, the CPU 107 reads information, as required, from the database for prediction 106a of the HDD 106 to store it as data for prediction 104a in the RAM 104, and executes various data processing based on the data for prediction 104a stored in the RAM 104.

The predicting program 106b is not always stored in the HDD 106. Therefore, the computer 100 may read the predicting program 106b from a recording medium, where it is previously stored, such as a Compact Disk-Read Only Memory (CD-ROM) and execute it. Furthermore, the predicting program 106b is stored in other computers (or servers) connected to the computer 100 through a public line, the Internet, a local area network (LAN), and a wide area network (WAN), and the computer 100 may read the program from the computers to execute it.

In the predicting method according to the present embodiment, the accumulation data which is the base of prediction includes a large number of combination patterns, and therefore, an appropriate prediction result can be obtained even if it is difficult to previously extract a rule. By generating a subset, at least a part of which matches the attribute information for assessment target data, a specific relationship embedded in the accumulation data can be extracted.

The accumulation data is reconstructed and analyzed according to the content of the attribute information for the assessment target data. Therefore, it is possible to obtain a prediction result appropriate for individual assessment target data. Even if prediction is performed using the same algorism and accumulation data, structuring results are different for each data pattern of the assessment target data. Accordingly, various statistics, risk assessment indexes, and combination patterns of values of elements become different from each other for each assessment target data, which allows appropriate assessment to be performed according to the accumulation data.

The combinations of subsets are generated by structuring, the prediction process is performed on each of the combinations generated, and a priority is given to each combination. And the prediction process is performed by reducing the priority of a combination, having less matching to assessment target data, which is a combination to which most part of the accumulation data belongs. It is thereby possible to largely save computing resource as compared with the case of analyzing in detail the whole accumulation data.

Furthermore, by performing simulations, parameter setting for the prediction process can automatically be adjusted, and high degree of analysis and prediction can automatically be performed.

Unlike the analysis method such as SVM and the neural network, the general statistical and mathematical method can be adopted for the data mining/analysis methods, which are used in the risk-assessment-index processing unit 23 and the risk assessing unit 24, and also adopted for the prediction assessment condition. Thus, any method can be adopted according to the property of data as the assessment criteria of risk and the prediction base thereof, and the method can be presented based on the statistical method adopting the basis of the assessment.

According to an embodiment of the present invention, a plurality of subset data are derived from the accumulation data according to assessment target data, and the prediction process is performed based on more important data, among these subset data, for the assessment target data. Therefore, it is possible to perform highly accurate prediction matching the assessment target data.

Furthermore, according to an embodiment of the present invention, the significance with respect to the assessment target data is assessed for each subset data. Therefore, as the whole accumulation data, a linkage between pieces of data hidden is made apparent in the subset data, and the prediction process can be performed using an ordinary method without using an advanced method such as the nonlinear method, and the basis for the prediction is also clarified.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium storing instructions for predicting a result of assessment target data including a new combination of the attribute values, which when executed by a computer having at least one processor and at least one storage device, causes the computer to perform:

structuring by the processor by generating a combination pattern of the attribute values by combining an attribute value of the assessment target data with an attribute value indicating an unspecified value;

reconstructing by the processor by searching for data matching the combination pattern from accumulation data in the storage device in which a correlation between a combination of attribute values and a result of the combination is accumulated, and generating a plurality of subset data;

setting by the processor a risk assessment index for each of the plurality of subset data generated in the reconstructing, the risk assessment index indicating a significance of a relationship between each of the plurality of subset data and the assessment target data, in such manner that, when first subset data and second subset data are included in subset data in which a combination of attribute values is statistically valid, and when the first subset data is included in the second subset data, a value indicating that the first subset data has precedence over the second subset data is set as the risk assessment index;

predicting by the processor the result of assessment target data based on the accumulation data; and assessing including selecting subset data that becomes a basis of assessment, based on the risk assessment index set by the processor, and performing by the processor, an assessment on a prediction result based on the selected subset data.

2. The computer-readable recording medium according to claim 1, wherein the setting includes setting the index in such a manner that subset data having larger number of attribute values matching the assessment data has precedence over other subset data.

3. The computer-readable recording medium according to claim 2, wherein the assessing includes preparing a plurality of methods for assessing the prediction result based on the subset data; and performing the assessment on the prediction result by changing the methods.

4. The computer-readable recording medium according to claim 1, wherein the assessing includes a plurality of methods for assessing the prediction result based on the subset data; and performing the assessment on the prediction result by changing the methods.

5. The computer-readable recording medium according to claim 1, wherein the assessing includes preparing a plurality of methods for assessing the prediction result based on the subset data; and performing the assessment on the prediction result by changing the methods.

6. The computer-readable recording medium according to claim 1, wherein the setting includes a plurality of methods for determining a statistic validity of the combination; and the index by changing the methods.

7. The computer-readable recording medium according to claim 1, wherein the instructions further cause the computer to perform:

simulating including repeatedly changing a parameter until a predetermined condition is satisfied.

8. The computer-readable recording medium according to claim 1, wherein the instructions further cause the computer to perform:

employing a user interface capable of displaying information used for each process.

9. An apparatus, having at least one Processor and at least one storage device, for predicting a result of assessment target data including a new combination of the attribute values, the apparatus comprising:

a structuring unit that generates by the processor a combination pattern of the attribute values by combining an attribute value of the assessment target data with an attribute value indicating a unspecified value;

a reconstructing unit that searches by the processor for data matching the combination pattern from accumulation data in which a correlation between a combination of attribute values and a result of the combination is accumulated, and generates a plurality of subset data;

an index setting unit that sets by the processor a risk assessment index for each of the plurality of subset data generated by the reconstructing unit, the risk assessment index indicating a significance of a relationship between each of the plurality of subset data and the assessment target data, in such manner that, when first subset data and second subset data are included in subset data in which a combination of attribute values is statistically valid, and when the first subset data is included in the second subset data, a value indicating that the first subset data has precedence over the second subset data is set as the risk assessment index;

a predicting unit that predicts by the processor the result of assessment target data based on the accumulation data; and an assessing unit that selects subset data that becomes a basis of assessment, based on the risk assessment index set by the index setting unit, and performs an assessment on a prediction result based on the selected subset data.

10. A method of predicting a result of assessment target data including a new combination of the attribute values, using a computer having at least one processor and at least one storage device, the method comprising:

structuring including combining by the processor an attribute value of the assessment target data with an attribute value indicating an unspecified value; and generating by the processor a combination pattern of the attribute values;

reconstructing including searching by the processor data matching the combination pattern from accumulation data in which a correlation between a combination of attribute values and a result of the combination is accumulated; and generating by the processor a plurality of subset data;

setting by the processor a risk assessment index for each of the plurality of subset data generated in the reconstructing, the risk assessment index indicating a significance of a relationship between each of the plurality of subset data and the assessment target data, in such manner that, when first subset data and second subset data are included in subset data in which a combination of attribute values is statistically valid, and when the first subset data is included in the second subset data, a value indicating that the first subset data has precedence over the second subset data is set as the risk assessment index;

predicting by the processor the result of the assessment target data based on accumulation data; and assessing including selecting subset data that becomes a basis of assessment, based on the risk assessment index set by the processor; and performing an assessment on a prediction result based on the selected subset data.

* * * * *

UNITED STATES PATENT AND TRADEMARK OFFICE
CERTIFICATE OF CORRECTION

PATENT NO. : 7,668,826 B2 Page 1 of 1
APPLICATION NO. : 11/447145
DATED : February 23, 2010
INVENTOR(S) : Masaru Watanabe It is certified that error appears in the above-identified patent and that said Letters Patent is hereby corrected as shown below:

Column 17, Line 26, change "Processor" to --processor--.

Signed and Sealed this

Twenty-fifth Day of May, 2010

David J. Kappos
*Director of the United States Patent and Trademark Office*